United States Patent
Kim et al.

(10) Patent No.: US 8,351,370 B2
(45) Date of Patent: Jan. 8, 2013

(54) METHOD OF TRANSMITTING SCHEDULING REQUEST SIGNAL

(75) Inventors: Hak Seong Kim, Anyang-si (KR); Bong Hoe Kim, Anyang-si (KR); Young Woo Yun, Anyang-si (KR); Ki Jun Kim, Anyang-si (KR); Dae Won Lee, Anyang-si (KR); Seong Hoon Jeong, Anyang-si (KR); Dong Wook Roh, Anyang-si (KR); Suk Hyon Yoon, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 12/673,488

(22) PCT Filed: Aug. 14, 2008

(86) PCT No.: PCT/KR2008/004724
§ 371 (c)(1),
(2), (4) Date: Feb. 12, 2010

(87) PCT Pub. No.: WO2009/022866
PCT Pub. Date: Feb. 19, 2009

(65) Prior Publication Data
US 2011/0216713 A1  Sep. 8, 2011

Related U.S. Application Data

(60) Provisional application No. 60/982,147, filed on Oct. 24, 2007.

(30) Foreign Application Priority Data

Aug. 14, 2007  (KR) .......................... 10-2007-0082021
Jan. 29, 2008  (KR) .......................... 10-2008-0009193

(51) Int. Cl.
*H04B 7/212* (2006.01)

(52) U.S. Cl. ........................................ 370/322
(58) Field of Classification Search .......... 370/310–350, 370/431–464
See application file for complete search history.

(56) References Cited

U.S. PATENT DOCUMENTS 8,068,466 B2 * 11/2011 Muharemovic et al. ...... 370/335
(Continued)

OTHER PUBLICATIONS

Timo Lunttila and Jari Lindholm, Coherent and Non-Coherent Control Signaling, Nokia Siemens Netwroks Oy, U.S. Appl. No. 60/926,479.*

(Continued)

*Primary Examiner* — Andrew Lai
*Assistant Examiner* — Juvena Loo
(74) *Attorney, Agent, or Firm* — McKenna Long & Aldridge LLP

(57) ABSTRACT

A method of transmitting a scheduling request signal, wherein the scheduling request signal is used to request a radio resource for uplink transmission in a wireless communication system is provided. The method includes configuring a physical uplink control channel (PUCCH) for transmission of a scheduling request signal in a subframe, the subframe comprising two consecutive slots, a slot comprising a plurality of single carrier-frequency division multiple access (SC-FDMA) symbols, the scheduling request signal being carried by a presence or absence of transmission of the PUCCH, wherein at least one SC-FDMA symbol is assigned for transmission of a sounding reference signal, and transmitting the scheduling request signal and the sounding reference signal in the subframe. Scheduling request signal can be transmitted without interference with other control signals such as sounding reference signal that are transmitted on the same control channel with the scheduling request signal.

11 Claims, 21 Drawing Sheets

U.S. PATENT DOCUMENTS

2007/0293233 A1* 12/2007 Inoue et al. .................. 455/450
2008/0101440 A1* 5/2008 Lee ............................... 375/141
2008/0268860 A1* 10/2008 Lunttila et al. ............... 455/450
2009/0316811 A1* 12/2009 Maeda et al. ................. 375/260

OTHER PUBLICATIONS

Alcatel-Lucent, "Multiplexing the Scheduling Request in the Uplink", R1-073066, 3GPP TSG-RAN WG1 #49bis, Orlando, US, Jun. 25-29, 2007.

Nokia Siemens Networks, Nokia, "Multiplexing of Scheduling Request and ACK/NACK and/or CQI", 3GPP TSG-RAN WG1 #49bis, R1-073011, Orlando, USA, Jun. 25-29, 2007.

Nokia Siemens Networks, Nokia, "Performance of CQI + ACK/NACK transmission on PUCCH", 3GPP TSG-RAN WG1 Meeting #49bis, R1-073003, Orlando, USA, Jun. 25-29, 2007.

NEC Group, NTT Docomo, "Multiplexing of uplink data-non-associated control signal with data", 3GPP TSG-RAN WG1 #49bis, R1-072833, Orlando, USA, Jun. 25-29, 2007.

* cited by examiner

Base station

User equipment

METHOD OF TRANSMITTING SCHEDULING REQUEST SIGNAL

This application is a National Stage Entry of International Application No. PCT/KR2008/004724, filed on Aug. 14, 2008, and claims priority to Korean Patent Application Nos. 10-2007-0082021, filed Aug. 14, 2007 and 10-2008-0009193, filed Jan. 29, 2008; and U.S. Provisional Application No. 60/982,147, filed Oct. 24, 2007, each of which is hereby incorporated by reference in its entirety as if fully set forth herein.

TECHNICAL FIELD

The present invention relates to a wireless communication, and more specifically, to a method of transmitting a scheduling request signal for requesting uplink radio resource allocation.

BACKGROUND ART

One of the systems being considered after the third generation is an Orthogonal Frequency Division Multiplexing (OFDM) system that can diminish inter-symbol interference effect owing to low complexity. OFDM converts serial input data into N parallel data and transmits the parallel data on N orthogonal subcarriers. The subcarriers maintain orthogonality in frequency dimension. Orthogonal Frequency Division Multiple Access (OFDMA) is a multiple access method that realizes multiple access by independently providing each user with some of available subcarriers in a system using OFDM as a modulation scheme.

One of major problems of the OFDM/OFDMA system is that PAPR (Peak-to-Average Power Ratio) can be very high. A problem of PAPR is that peak amplitude of a transmission signal is much higher than average amplitude, which is due to the fact that an OFDM symbol is overlap of N sinusoidal signals on different subcarriers. PAPR is particularly related to capacity of a battery and causes a problem in a user equipment that is sensitive to power consumption. In order to reduce power consumption, the PAPR needs to be lowered.

One of systems proposed to lower PAPR is Single Carrier-Frequency Division Multiple Access (SC-FDMA). SC-FDMA is a form that combines Single Carrier-Frequency Division Equalization (SC-FDE) scheme and Frequency Division Multiple Access (FDMA) scheme. SC-FDMA has a characteristic similar to that of OFDMA in that it modulates and demodulates data in time and frequency domains using Discrete Fourier Transform (DFT). However, since PAPR of a transmission signal is low, SC-FDMA is advantageous for saving transmission power. Particularly, in relation to use of battery, SC-FDMA is advantageous to uplink through a user equipment sensitive to transmission power communicates with the base station.

An important point when the user equipment transmits data to the base station is a wide coverage, in which bandwidth of data is not so wide, but power can be concentrated. An SC-FDMA system lowers variance of a signal and thus has a coverage further wider that those of other systems when using the same power amplifier.

In order to implement a variety of transmit or receive techniques for transmitting high-speed packet, transmission of control signals in time, space, and frequency domains is an indispensable element. A channel that transmits control signals is referred to as a control channel. There may be various kinds of uplink control signals, such as a scheduling request signal transmitted by a user equipment to the base station to allocate uplink radio resources, an Acknowledgement (ACK)/Negative-Acknowledgement (NAK) that is a response to uplink data transmission, Channel Quality Indicator (CQI) for indicating channel quality of downlink, Precoding Matrix Index (PMI), Rank Indicator (RI), and the like.

The scheduling request signal is carried by a presence or absence of transmission (or on/off keying) of a control channel, which is used for a user equipment to request a base station to perform scheduling for the user equipment. So when the user equipment needs to transmit uplink data to the base station, the scheduling request signal should be preliminarily transmitted. In most cases where the transmission interval of the scheduling request signal is not overlapped with those of an ACK/NACK signal and CQI, the scheduling request signal is independently transmitted using a dedicated resource. Accordingly, an occasion where a user should simultaneously transmit the scheduling request signal and ACK/NACK signal does not frequently occur. However, particularly, in the case where downlink data is frequently transmitted and no uplink data is transmitted, if uplink data transmission is urgently needed, probability of occurring such an occasion is further higher. This will invite a problem in transmission of an uplink control channel and give a negative affect to downlink and uplink throughputs. In such a situation, there are largely two methods for requesting scheduling.

First, there is a method of requesting uplink scheduling in a contention-free scheme using a scheduling request signal channel. Such a method is referred to as a multi-code transmission method or a multi-sequence transmission method. That is, it refers to a method of simultaneously transmitting a plurality of independent signals using one or more sequences by a user. However, although scheduling request signals are simultaneously transmitted using a separated scheduling request signal channel, if a plurality of ACK/NACK signals is transmitted to uplink, characteristics of an uplink single carrier are damaged, and thus PAPR is increased as a result.

Second, there is a method of requesting scheduling by performing Time Division Multiplexing (TDM) or joint coding on an ACK/NACK signal and a scheduling request signal in the unit of a symbol or slot. However, when two or more signals having different error requirements are simultaneously coded and transmitted, all signals ultimately should follow a power setting value of a signal that has the strictest requirement, and thus there may be a problem of wasting power. Although such a power wasting problem can be solved in a variety of methods, a plurality of signals should be transmitted in one subframe, and thus it is certain that power consumption increases compared with a case where one signal is transmitted in one subframe.

Accordingly, it is required to transmit a scheduling request signal efficiently using an ACK/NACK channel and CQI channel, which are existing control channels. In order to operate the scheduling request signal on an existing control channel, compatibility of the control channel with other control signals should be considered. In addition, capacity of a user equipment capable of transmitting a scheduling request signal should be also considered.

Accordingly, an efficient control channel structure is needed to transmit a scheduling request signal.

DISCLOSURE OF INVENTION

Technical Problem

The present invention provides a method of transmitting scheduling request signal, wherein the scheduling request signal is transmitted on the same uplink control channel as other control signals without interference.

Technical Solution

According to an embodiment of the present invention, a method of transmitting a scheduling request signal, wherein the scheduling request signal is used to request a radio resource for uplink transmission in a wireless communication system is provided. The method includes configuring a physical uplink control channel (PUCCH) for transmission of a scheduling request signal in a subframe, the subframe comprising two consecutive slots, a slot comprising a plurality of single carrier-frequency division multiple access (SC-FDMA) symbols, the scheduling request signal being carried by a presence or absence of transmission of the PUCCH, wherein at least one SC-FDMA symbol is assigned for transmission of a sounding reference signal, and transmitting the scheduling request signal and the sounding reference signal in the subframe.

According to another embodiment of the present invention a method of transmitting a scheduling request signal, the method includes generating a physical uplink control channel (PUCCH) carrying a scheduling request signal in form of presence or absence in a subframe, the subframe comprising a first slot and a second slot, a slot comprising a plurality of SC-FDMA symbols, the scheduling request signal spreaded by a first orthogonal covering sequence in the first slot and a second orthogonal covering sequence in the second slot, wherein the length of the first orthogonal covering sequence is shorter than that of the second orthogonal covering sequence, and transmitting the scheduling request signal on the PUCCH and a sounding reference signal using a SC-FDMA symbol of the first slot.

Advantageous Effects

Scheduling request signal can be transmitted without interference with other control signals such as sounding reference signal that are transmitted on the same control channel with the scheduling request signal.

MODE FOR THE INVENTION

Hereinafter, exemplary embodiments of the present invention will be described in detail with reference to the accompanying drawings so that this disclosure can be thorough and complete, and will fully convey the concept of the invention to those skilled in the art.

Figure 1:
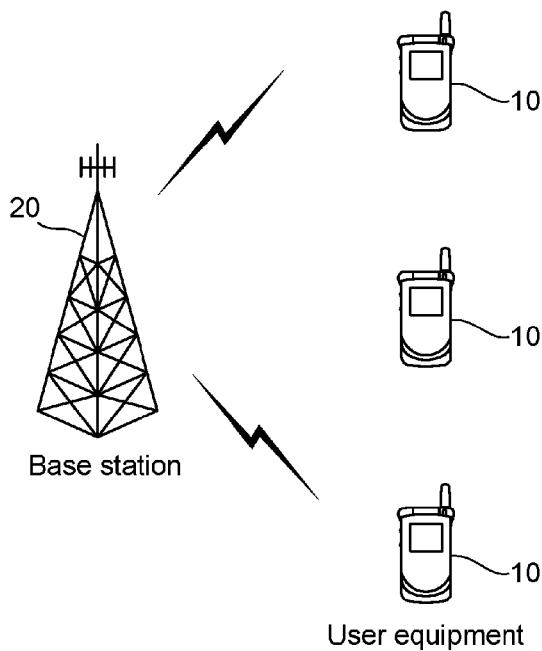
FIG. 1 is a block diagram showing a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The BS 20 is generally a fixed station that communicates with the UE 10 and may be referred to as another terminology, such as a node-B, a base transceiver system (BTS), an access point, etc. There are one or more cells within the coverage of the BS 20. The UE 10 may be fixed or mobile, and may be referred to as another terminology, such as a mobile station (MS), a user terminal (UT), a subscriber station (SS), a wireless device, etc.

A downlink represents a communication link from the BS 20 to the UE 10, and an uplink represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system.

Figure 2:
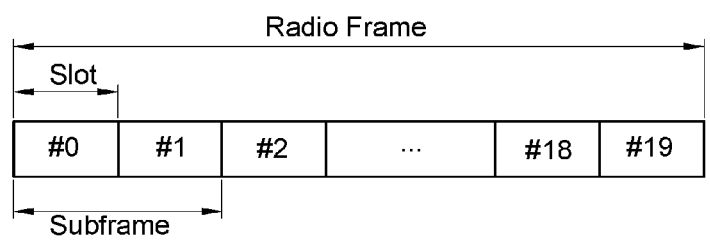
FIG. 2 shows an exemplary structure of a radio frame.

FIG. 2 shows an exemplary structure of a radio frame.

Referring to FIG. 2, the radio frame includes 10 subframes. One subframe includes two slots. The subframe is a basic unit of data transmission. Downlink or uplink scheduling is performed in a subframe unit. One slot may include a plurality of OFDM symbols in a time domain and at least one subcarrier in a frequency domain. One slot may include 7 or 6 OFDM symbols.

The radio frame structure is shown for exemplary purposes only. Thus, the number of subframes included in the radio frame, the number of slots included in the subframe, and the number of OFDM symbols and subcarriers included in the slot can change variously.

Figure 3:
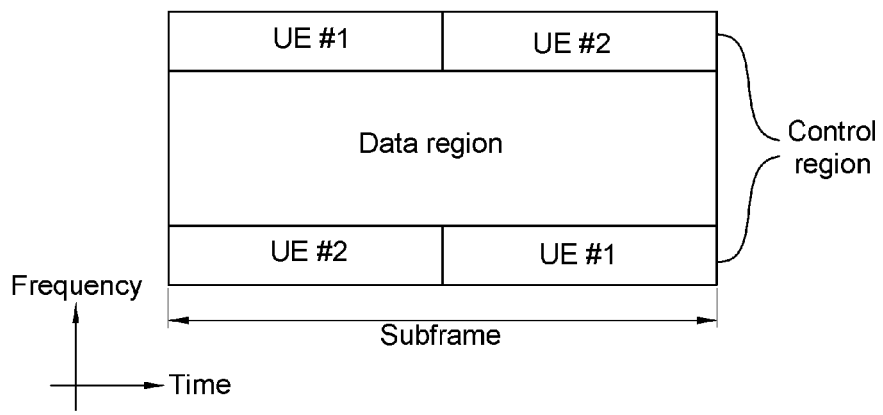
FIG. 3 shows an example of a subframe.

FIG. 3 shows an example of a subframe. This may be an uplink subframe.

Referring to FIG. 3, a subframe can be divided into a control channel and a data region. The control channel is a region for transmitting only control signals, which is generally allocated to a control channel. The data region is a region for transmitting data, which is generally allocated to a data channel. The control channel may be referred to as physical uplink control channel (PUCCH), and the data channel may be referred to as physical uplink shared channel (PUSCH). The control channel and the data channel can be configured as a subframe. The control signal is a signal that is not user data, and there may be various kinds of control signals such as an ACK (Acknowledgement)/NACK (Negative-Acknowledgement) signal, CQI (Channel Quality Indicator), PMI (Precoding Matrix Index), RI (Rank Indicator), scheduling request signal, and the like.

Although only control signals are loaded on the control region, user data can be loaded on the data region together with control signals. That is, when a user equipment transmits only control signals, the user equipment is allocated with a control channel and transmits the control signals, and when the user equipment transmits data together with control signals, the user equipment may be allocated with a data region and transmit the data and control signals. Exceptionally, although the user equipment transmits only control signals, if the amount of the control signals is large or the control signals are inappropriate to be transmitted on a control channel, the user equipment can be allocated with radio resources on the data region and transmit the control signals.

Since the control channel and the data region use frequency bands different from each other, they are multiplexed in Frequency Division Multiplexing (FDM). However, this is merely an example, and allocation of the control channel and data region on a subframe is not a restriction.

From the view point of a user equipment, each slot in a subframe can be divided into two portions in the frequency domain. When a first subframe is divided into a first slot and a second slot, the first slot is divided into a first region and a second region in the frequency domain, and the second slot also can be divided into a first region and a second region in the frequency domain. When it is assumed that the first region transmits control signals and the second region transmits user data in the first slot, the first region may transmit user data and the second region may transmit control signals in the second slot. If there are many terminals, although both of the first and second regions may transmit control signals in the first slot, a user does not simultaneously use both of the shared resource regions.

A slot allocated to each user equipment may be frequency hoped on a subframe. That is, the frequency band of one side is allocated for one of two slots in one subframe, and the frequency band of the other side may be allocated to the other slot. Frequency diversity gain can be obtained by transmitting a control channel for a user equipment on slots allocated to frequency bands different from each other.

Two-dimensional spreading of frequency spreading and time-domain covering can be applied to the structure of an uplink control channel. A reference signal can be defines for coherent detection.

To clarify the explanation, hereinafter, one slot is configured with seven OFDM symbols, and one subframe including two slots includes total fourteen OFDM symbols. The number of OFDM symbols included in one subframe or the number of OFDM symbols included in one slot is merely an example, and the technical spirit of the present invention is not limited to this.

Figure 4:
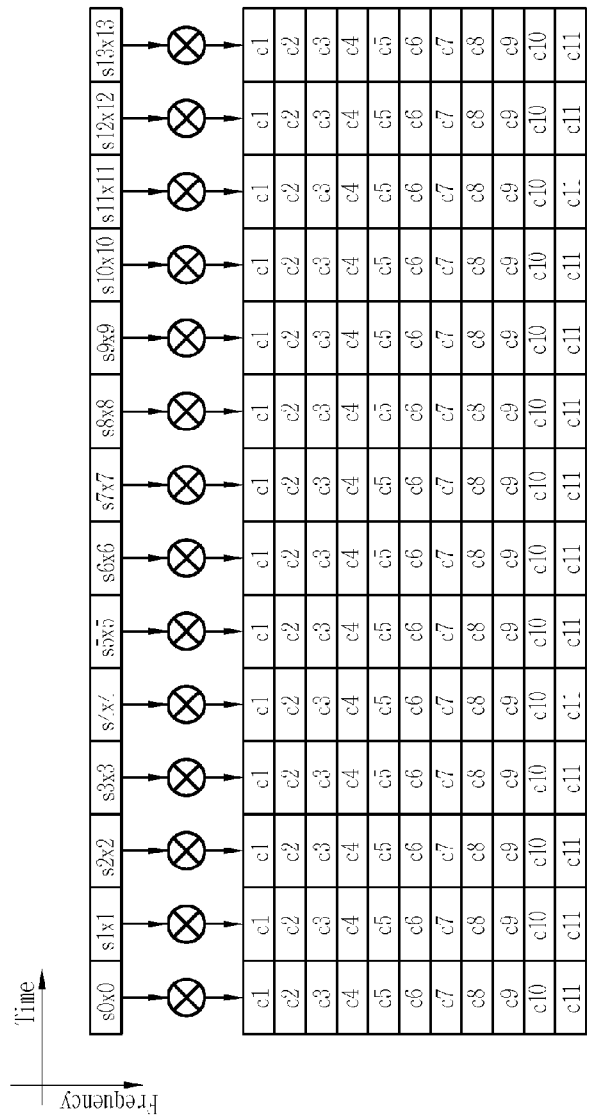
FIG. 4 shows an exemplary structure of a control channel applied with two-dimensional spreading.

FIG. 4 shows an exemplary structure of a control channel applied with two-dimensional spreading.

Referring to FIG. 4, $\{s0, s1, \ldots, s13\}$ represents a sequence of control signals corresponding to respective OFDM symbols, and $\{x0, x1, \ldots, x13\}$ represents time domain spreading codes corresponding to respective OFDM symbols. A well-known orthogonal code such as a Walsh code can be used as the time domain spreading code for time domain spreading. $\{c0, c1, \ldots, c11\}$ is frequency domain spreading codes, and a Zadoff-Chu (ZC) CAZAC (Constant Amplitude Zero Auto-Correlation) sequence can be used.

The ZC CAZAC sequence is a kind of CAZAC sequence, and when N is the length of a CAZAC sequence of a positive integer, and M is a prime number relative to N (M is a natural number less than N, which is a prime number relative to N), the k-th element of the M-th CAZAC sequence can be expressed as shown in Equation 1.

MathFigure 1

$$c(k; N, M) = \exp\left\{-\frac{j\pi Mk(k+1)}{N}\right\}$$ [Math. 1]

where $N$ is an odd vmber $$c(k; N, M) = \exp\left\{-\frac{j\pi Mk^2}{N}\right\}$$

where $N$ is an even vmber

This is merely an example, and other sequences having a superior correlation characteristic can be applied. Between different user equipments, ZC CAZAC sequences having different circular shift values are applied to distinguish a channel.

Figure 5:
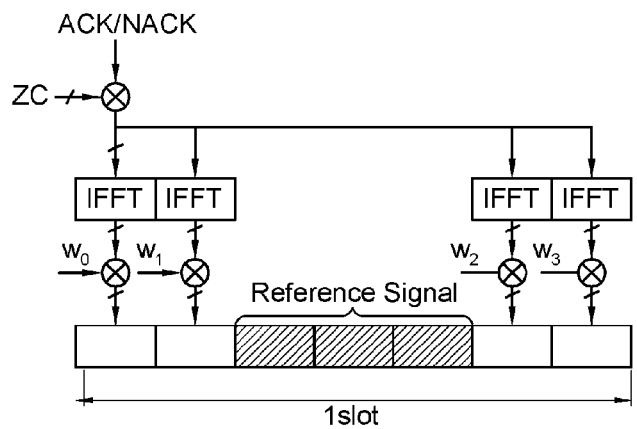
FIG. 5 shows the structure of an ACK/NACK channel.

In a frequency domain spreading code, circular shift hopping can be applied to every OFDM symbol. That is, although FIG. 5 shows that the same frequency domain spreading code is applied to every OFDM symbol, the frequency domain spreading code can be circular shifted at every OFDM symbol. This is called as circular shift hopping. When the circular shift hopping is performed, characteristics of a control channel can be prevented from being abruptly deteriorated at a specific circular shift value due to a high correlation.

FIG. 5 shows the structure of an ACK/NACK channel. The ACK/NACK channel is a control channel for transmitting ACK/NACK signals. The ACK/NACK signal a transmit and/or receive confirmation signal for downlink data. When a control signal is transmitted within a previously allocated band, frequency domain spreading and time domain spreading are simultaneously applied in order to increase the number of user equipments or control channels that can be multiplexed.

Referring to FIG. 5, a reference signal (RS) is carried on three OFDM symbols in the middle portion of seven OFDM symbols in one slot, and an ACK/NACK signal is loaded on the other four OFDM symbols in the one slot. The reference signal is loaded on three contiguous OFDM symbols in the middle of the slot. At this time, the number and positions of symbols used for the reference signal can be changed, and the number and positions of symbols used for the ACK/NACK signal related thereto also can be changed depending thereon.

A frequency domain spreading code is used to spread the ACK/NACK signal in the frequency domain. The ZC CAZAC sequence described above can be used as the frequency domain spreading code. Each user equipment can be distinguished by applying ZC CAZAC sequences having circular shift values different from each other. Depending on delay spread of a channel, the number of available circular shifts may be changed.

After IFFT is performed on the ACK/NACK signal which is spread in the frequency domain, the ACK/NACK signal is spread again in the time domain using a time domain spreading code. The ACK/NACK signal is spread using a time domain spreading code of length four w0, w1, w2, w3 for four OFDM symbols. In addition, the ACK/NACK signal can be spread by a spreading code of length three for a reference signal.

Performing time domain spreading after performing frequency domain spreading is merely an example, and the order of performing the time domain spreading and frequency domain spreading is not restricted. The frequency domain spreading can be performed after the time domain spreading, or the time domain spreading and frequency domain spreading can be simultaneously performed using a sequence of one combined form.

Figure 6:
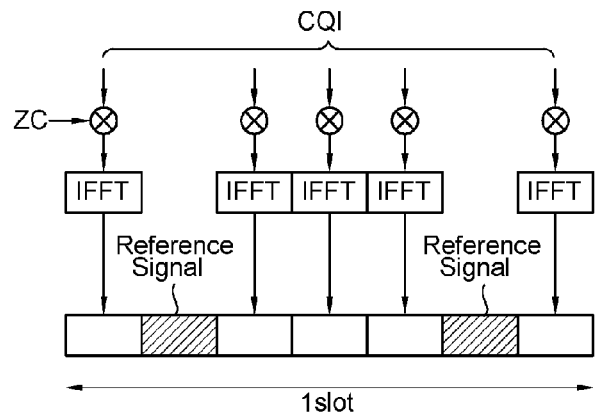
FIG. 6 shows the structure of a CQI channel.

FIG. 6 shows the structure of a CQI channel. The CQI channel is a control channel for transmitting CQI. The CQI does not use time domain spreading in order to secure sufficient symbol space.

Referring to FIG. 6, a reference signal is loaded on two OFDM symbols apart from each other by three OFDM symbols among seven symbols included in one slot, and CQI is loaded on the other five OFDM symbols. The proposed values are merely an example, and the number and positions of the OFDM symbols used for the reference signal and the number and positions of the OFDM symbols used for CQI can be changed. Since a CQI value of two bits can be loaded when Quadrature Phase Shift Keying (QPSK) mapping is used for one OFDM symbol, a CQI value of ten bits can be loaded on one slot. A CQI value of maximum twenty bits can be loaded for one subframe. A modulation scheme other than QPSK, such as 16-QAM or the like, can be applied as a modulation scheme used for CQI.

A frequency domain spreading code is used to spread CQI in the frequency domain. A ZC CAZAC sequence can be used as a frequency domain spreading code. Unlike applying two-dimensional spreading in an ACK/NACK channel, a CQI channel applies only one-dimensional spreading, and thus transmission capacity of CQI is increased.

A channel can be allocated as a scheduling request channel by reserving circular shift. This is the same as the example of the ACK/NACK channel except that the number of OFDM symbols for a reference signal is different. Unlike an ACK/NACK channel, there are many cases where less OFDM symbols are allocated to a reference signal in a CQI channel. It is since that a user is identified only by distinguishing a sequence on the frequency axis and thus spreading is not needed on the time axis. Accordingly, minimum one OFDM symbol can function as a reference signal. Although about two OFDM symbols can be allocated as a reference signal if a Doppler effect is high, it is difficult to apply time domain spreading.

However, a time domain spreading code can be defined in order to define a scheduling request channel. When coherent detection is supported, about three OFDM symbols are allocated as a reference signal like the ACK/NACK channel structure, and a control signal portion can be transmitted separately from a reference signal portion. When non-coherent detection is supported, the time domain spreading code can be defined using a long sequence including the entire length of one slot. Even in this case, like the ACK/NACK channel, a set of sequences orthogonal to each other (a set of sequences having a low cross-correlation between each other) such as a circular shift of a ZC CAZAC sequence is defined and used as a time domain spreading code.

Figure 7:
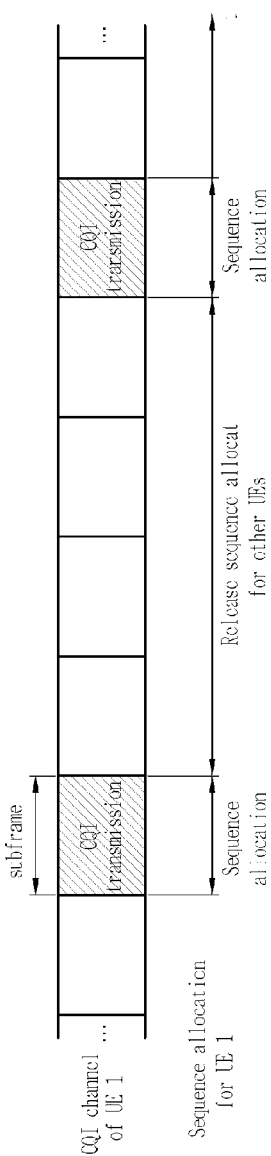
FIG. 7 shows an example of a method of allocating a sequence to CQI.

FIG. 7 shows an example of a method of allocating a sequence to CQI.

Referring to FIG. 7, UE1 uses a sequence allocated for transmitting CQI at every transmission interval and releases allocation of the sequence when it does not transmit CQI so that other users may use the sequence to transmit CQI. Of course, UE1 may reserve a sequence allocated for CQI transmission in advance and continue to occupy the sequence even when it does not transmit CQI.

Hereinafter, a method of creating a scheduling request channel for transmitting a scheduling request signal will be described.

A scheduling request signal is a signal for requesting, by a user equipment, the base station to allocate uplink radio resources. When the user equipment transmits uplink data to the base station, a scheduling request signal should be transmitted. If the user equipment requests scheduling through the scheduling request signal, the base station allocated radio resources for transmitting uplink data and informs the user equipment of the radio resource allocation. A control channel for transmitting the scheduling request signal is referred to as a scheduling request channel.

As a method for creating a scheduling request channel, there may be a method of allocating a dedicate channel as a scheduling request channel and a method of reserving a channel that transmits other control signals, such as an ACK/NACK channel or CQI channel, as a scheduling request channel. The former is a method of allocating new time-frequency resources for transmitting scheduling request signals. In the latter case, the scheduling request channel is created together with other control channels and is compatible with other control channels. That is, although the scheduling request signal shares the same time-frequency resources with other control signals, the scheduling request signal is distinguished by using a difference sequence.

In the former case, when a plurality ACK/NACK signals is transmitted on uplink as described above, characteristics of the uplink single carrier are deteriorated, and thus PAPR increases as a result. Hereinafter, a method of efficiently transmitting a scheduling request signal in the latter case will be described.

When a scheduling request signal is transmitted using an ACK/NACK or CQI channel, the following three cases can be occurred. A method of transmitting a scheduling request signal in each case is described. Hereinafter, a case where a scheduling request signal and other signals are simultaneously transmitted is referred to as a transmission contention.

First, there may be a case where a scheduling request signal and an ACK/NACK signal should be simultaneously transmitted in an ACK/NACK channel (transmission contention between the scheduling request signal and the ACK/NACK signal). Second, there may be a case where a scheduling request signal and CQI should be simultaneously transmitted in a CQI channel (transmission contention between the scheduling request signal and the CQI). Third, there may be a case where only a scheduling request signal is transmitted without contention between the scheduling request signal and other control signals.

A method of multiplexing a scheduling request signal and other control signal and a method of operating each control channel will be described in each of the cases where the scheduling request signal competes with other control signal for transmission. However, the present invention is not limited to the ACK/NACK or CQI channel, but is widely applied to a structure that configures a control channel to transmit a second control signal (e.g., a scheduling request signal) on a control channel that transmits a first control signal (e.g., an ACK/NACK signal, CQI, or the like).

First, described is a method of transmitting a scheduling request signal on an ACK/NACK channel when transmission contention occurs between an ACK/NACK signal and the scheduling request signal in the ACK/NACK channel.

In an embodiment, a user equipment selects only a signal based on a predetermined selection rule and transmits the selected signal. It is the principle of the selection rule to preferentially transmit an ACK/NACK signal and then transmit a scheduling request signal after delaying the scheduling request signal for a predetermined time period. Exceptionally, the scheduling request signal is transmitted prior to the ACK/NACK signal although transmission contention occurs only if the number of delays of the scheduling request signal (hereinafter, referred to as a delay count) caused by transmission contention is equal to a critical delay count. In this exceptional case, the user equipment retransmits the ACK/NACK signal.

Figure 8:
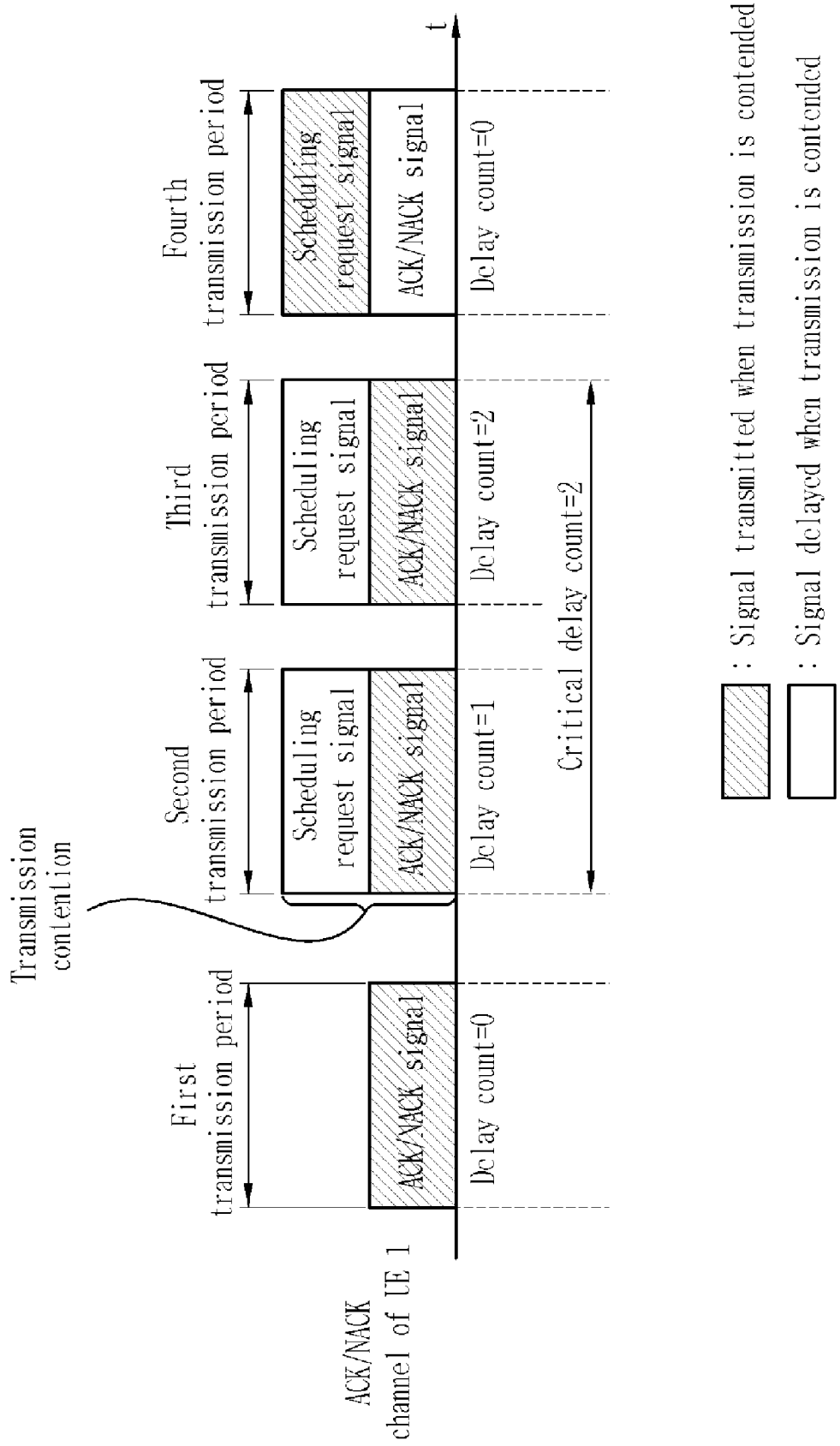
FIG. 8 shows a method of transmitting a scheduling request signal based on a selection rule on an ACK/NACK channel according to an embodiment of the present invention.

FIG. 8 shows a method of transmitting a scheduling request signal based on a selection rule on an ACK/NACK channel according to an embodiment of the present invention. An ACK/NACK signal may be periodically transmitted at regular transmission intervals, or non-periodically transmitted without being restricted to a transmission interval. When the ACK/NACK signal is transmitted at regular intervals, each of a first to fourth transmission periods corresponds to a transmission interval. The transmission period may be referred to as a transmission timing.

Referring to FIG. 8, UE1 having a critical delay count of 2 transmits an ACK/NACK signal in the first transmission period. At this time, the delay count is 0. When UE1 transmits a scheduling request signal in the second transmission period, transmission contention with the ACK/NACK signal occurs. Since the delay count is 0, it is smaller than the critical delay count of 2. Accordingly, UE1 delays transmission of the scheduling request signal and transmits the ACK/NACK signal. At this time, the delay count becomes 1.

When UE1 transmits a scheduling request signal again in the third transmission period, transmission contention with the ACK/NACK signal occurs. Since the delay count is 1, it is still smaller than the critical delay count of 2. Accordingly, UE1 delays transmission of the scheduling request signal again and transmits the ACK/NACK signal. At this time, the delay count becomes 2.

When UE1 transmits a scheduling request signal again in the fourth transmission period, transmission contention with the ACK/NACK signal occurs. Since the delay count is 2, it is equal to the critical delay count of 2. Therefore, UE1 delays transmission of the ACK/NACK signal and transmits the scheduling request signal at last. Since UE1 transmits the scheduling request signal, the delay count becomes 0 again.

The critical delay count of the selection rule can be differently determined depending on system status, importance or urgency of the scheduling request signal, or importance of the ACK/NACK signal. This is to distinguish the sequence of the scheduling request signal from the sequences allocated to ACK/NACK signals for other UEs.

Like an ACK/NACK signal, a common sequence is a sequence of a case where a predetermined set of sequences is previously reserved and a sequence allocated to an ACK/NACK signal is changed in every subframe depending on the position of a control signal used for downlink data transmission. Although the common sequence is allocated without a collision among ACK/NACK channels, a sequence once allocated may not be consistently allocated to one ACK/NACK channel. That is, changes of a sequence index may occur at any time for each UE.

On the other hand, a dedicated sequence is a sequence of a case where a sequence to be used for each user or scheduling request channel is previously allocated regardless of downlink data transmission. That is, a sequence allocated to a corresponding scheduling request channel is used at a time when a scheduling request signal is transmitted. The sequence does not change frequently unlike an ACK/NACK channel, and a sequence once allocated is exclusively used for a predetermined time period at a predetermined time point. That is, there is no changed in the sequence index.

Figure 9:
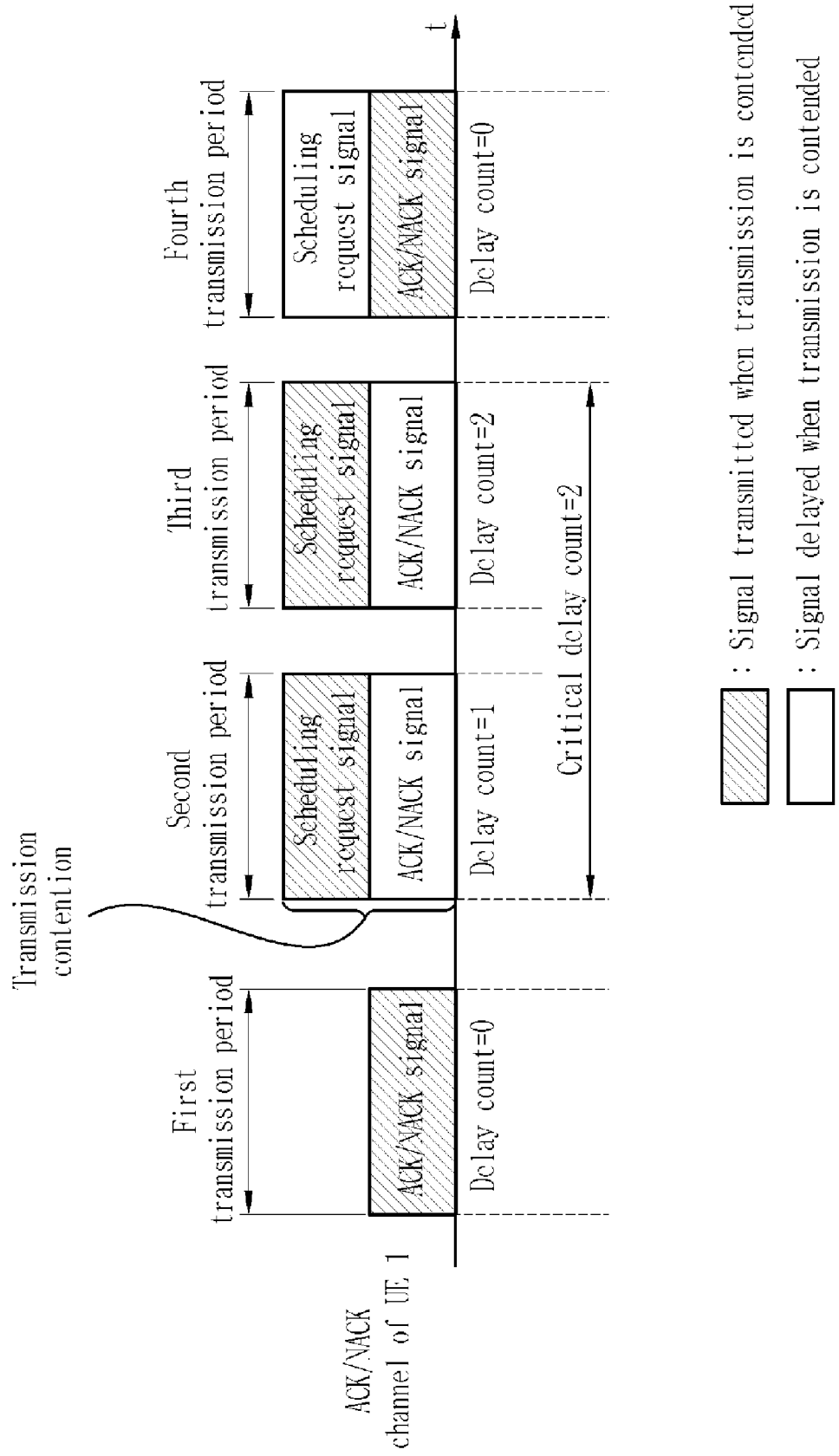
FIG. 9 shows a method of transmitting a scheduling request signal based on a selection rule on an ACK/NACK channel according to another embodiment of the present invention.

FIG. 9 shows a method of transmitting a scheduling request signal based on a selection rule on an ACK/NACK channel according to another embodiment of the present invention.

Referring to FIG. 9, unlike the selection rule of FIG. 8, UE1 delays the ACK/NACK signal, not the scheduling request signal, as many times as the critical delay count at every transmission contention and transmits the scheduling request signal. However, if the delay count of the ACK/NACK signal is equal to the critical delay count, the ACK/NACK signal is transmitted.

In another embodiment, the user equipment determines priorities of the scheduling request signal and the ACK/NACK signal, and selects and transmits either of the signals. The subject that determines the priority may be a user equipment or the base station. In the case where a user equipment determines the priority, when the user equipment by itself determines the priorities of the two signals and transmits either of the signals, the user equipment needs to transmit an additional signaling to the base station if the base station should know the information about the basis of the determination. Or, the user equipment does not transmit an additional signaling, and the base station itself may distinguish an ACK/NACK signal from a scheduling request signal in a blind method.

In the case where the base station determines the priorities, the base station should inform the user equipment of the information on the determination of the priorities. Accordingly, transmission of various kinds of additional information is needed. In the method of transmitting any one of signals depending on the priorities when transmission contention occurs, the system can operate in a form that is most appropriate to a downlink service related to an ACK/NACK signal and an uplink service related to a scheduling request signal.

Figure 10:
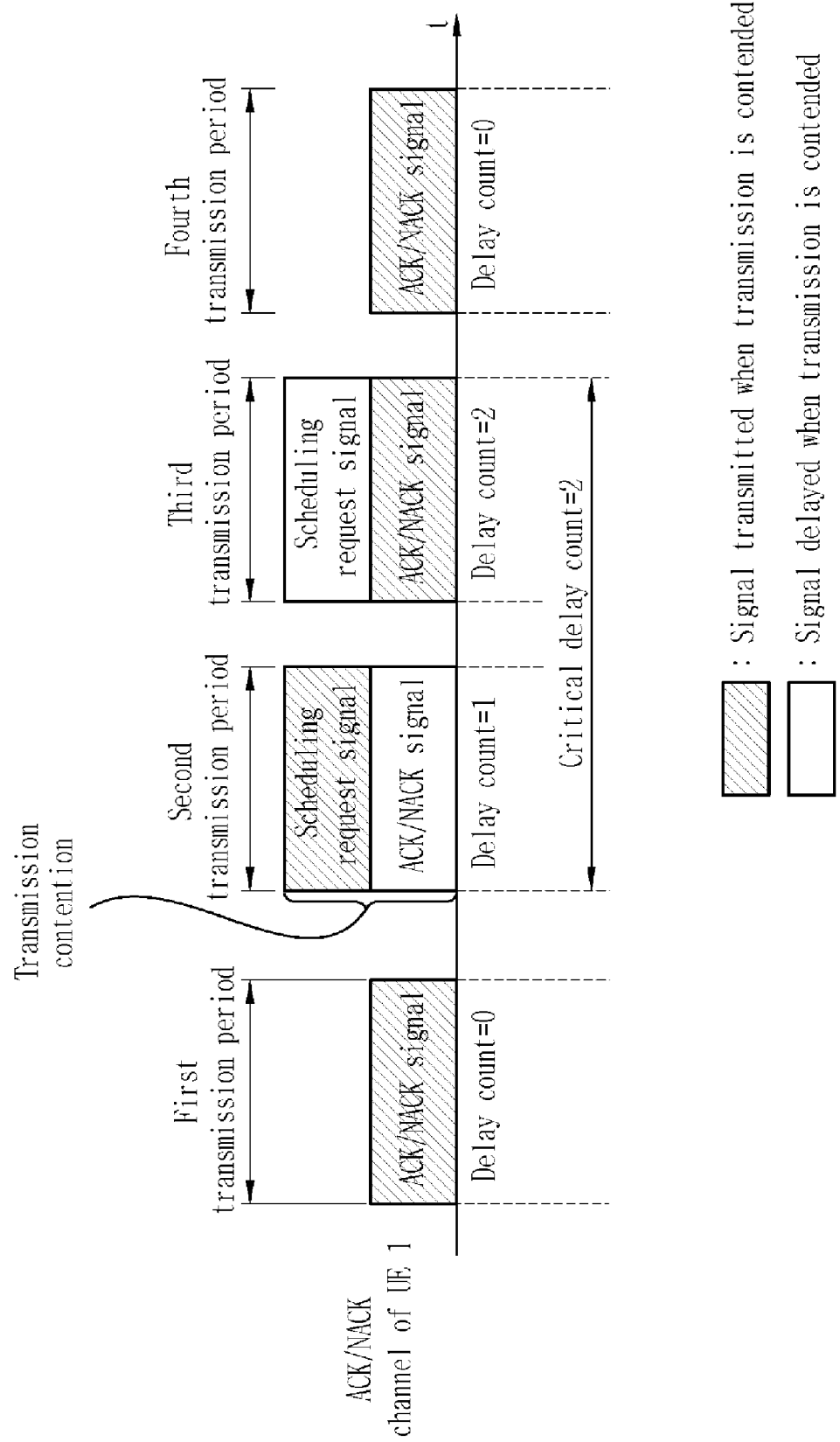
FIG. 10 shows a method of transmitting a scheduling request signal based on a priority on an ACK/NACK channel according to another embodiment of the present invention.

FIG. 10 shows a method of transmitting a scheduling request signal based on a priority on an ACK/NACK channel according to another embodiment of the present invention. An ACK/NACK signal may be periodically transmitted at regular transmission intervals, or non-periodically transmitted without being restricted to a transmission interval. When the ACK/NACK signal is transmitted at regular intervals, each of a first to fourth transmission periods corresponds to a transmission interval. The transmission period may be referred to as a transmission timing.

Referring to FIG. 10, UE1 transmits an ACK/NACK signal in the first transmission period. When UE1 transmits a scheduling request signal in the second transmission period, transmission contention with the ACK/NACK signal occurs. UE1 transmits the scheduling request signal and does not transmit the ACK/NACK signal depending on priorities. When UE1 transmits a scheduling request signal in the third transmission period, transmission contention occurs again with the ACK/NACK signal. UE1 transmits the ACK/NACK signal and does not transmit the scheduling request signal depending on priorities. UE1 transmits an ACK/NACK signal in the fourth transmission period. In this manner, when either of the signals is transmitted depending on priorities, a control channel, which is a limited radio resource, can be reasonably operated.

In yet another embodiment, the user equipment simultaneously transmits a scheduling request signal and an ACK/NACK signal. In this case, all cases can be expressed in a method of modulating a signal with a higher order modulation scheme.

Figure 11:
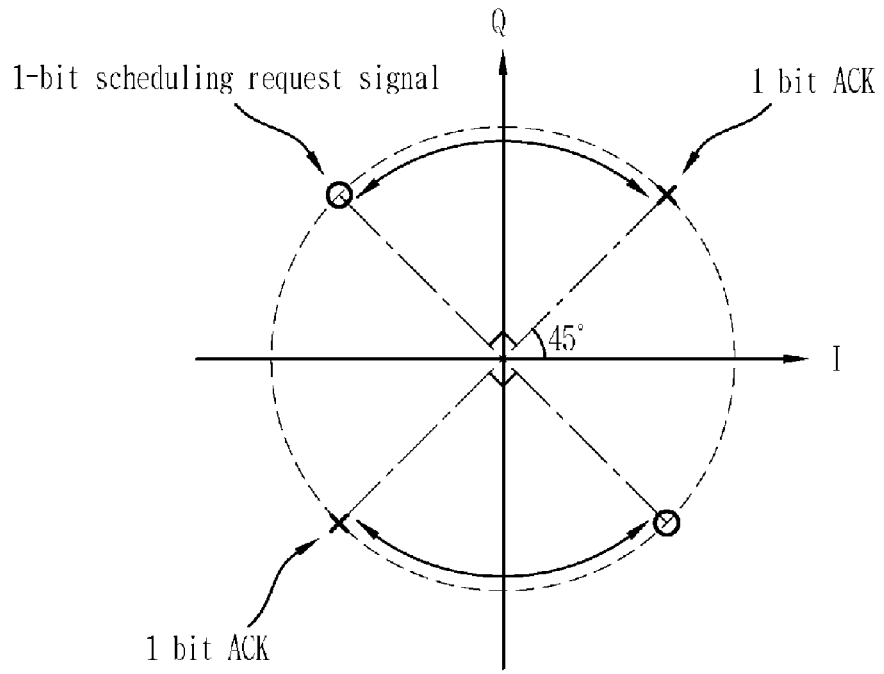
FIG. 11 shows a method of transmitting a scheduling request signal together with an ACK/NACK signal according to still another embodiment of the present invention.

FIG. 11 shows a method of transmitting a scheduling request signal together with an ACK/NACK signal according to still another embodiment of the present invention. FIG. 11 shows an example of a Single Input Multiple Output (SIMO) or a Multiple Input Multiple Output (MIMO) with rank 1, in which an ACK/NACK signal is expressed as 1-bit. The horizontal axis is I channel (In-phase), and the vertical axis is Q channel (Quadrature-phase).

Referring to FIG. 11, when a user equipment transmits an ACK/NACK signal, there may be four signal combinations as shown in Table 1 depending on existence of a scheduling request signal.

TABLE 1

| Combination of signals | ACK/NACK signal | Transmission of scheduling request signal |
|---|---|---|
| First combination | ACK | X |
| Second combination | ACK | O |
| Third combination | NACK | X |
| Fourth combination | NACK | O |

In the first combination, a user equipment does not request scheduling and transmits only an ACK signal. In the second combination, a user equipment requests scheduling and simultaneously transmits an ACK signal. In the third combination, a user equipment does not request scheduling and transmits only a NACK signal. In the fourth combination, a user equipment requests scheduling and simultaneously transmits a NACK signal.

In the figure, the constellation point marked with symbol + shows a case where only an ACK/NACK signal is transmitted, and the constellation point marked with symbol O shows a case where a scheduling request signal is transmitted together with an ACK/NACK signal.

If a user equipment transmits either ACK or NACK signal, Binary Phase Shift Keying (BPSK) modulation scheme may be used. Observing the constellation map, the point representing the ACK has a phase difference of 180 degrees from the point representing the NACK, and a signal having a phase of either of the two points is transmitted. That is, a signal having a phase of 45 degrees is transmitted in the first combination, and a signal having a phase of 225 degrees is transmitted in the third combination. Since the phase difference between a signal of the first combination and a signal of the third combination is 180 degrees, it is a BPSK modulation scheme rotated by pi/4.

In order to further include two more cases where existence of a scheduling request signal is expressed in addition to the ACK and the NACK, the constellation map should have two constellation points at positions different from those of the points representing the ACK and the NACK. That is, a signal having a phase of 135 degrees is transmitted in the second combination, and a signal having a phase of 315 degrees is transmitted in the fourth combination. Since the phase difference between a signal of the second combination and a signal of the fourth combination is 180 degrees, it is a BPSK modulation scheme.

Of course, the method described above can be generalized. Existence of a scheduling request signal can be expressed by rotating the phase of an ACK/NACK signal using BPSK modulation scheme by a predetermined phase. That is, when an ACK signal and a scheduling request signal are simultaneously transmitted, only the phase of the ACK signal to be transmitted is rotated by a predetermined degree, e.g., 90 degrees, clockwise or counterclockwise. Or, when a NACK signal and a scheduling request signal are simultaneously transmitted, only the phase of the NACK signal to be transmitted is rotated by a predetermined degree, e.g., 90 degrees, clockwise or counterclockwise. FIG. 11 is a view showing a signal whose phase is rotated by 90 degrees.

In addition to the method described above, an ACK/NACK signal and a scheduling request signal may be transmitted in different orthogonal spaces. For example, it is possible to transmit an ACK/NACK signal by multiplying a cosine value and a scheduling request signal by multiplying a sine value. In other words, respective signals can be transmitted on I channel and Q channel.

On the other hand, when a scheduling request signal is transmitted in an ON/OFF keying method, the constellation map can be expressed in a form different from that of FIG. 11.

Figure 12:
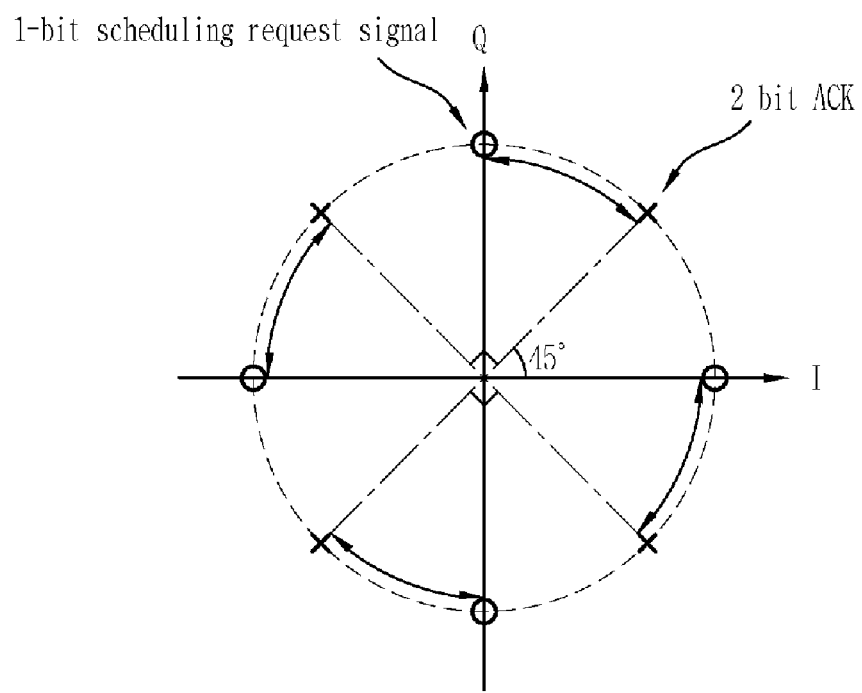
FIG. 12 shows a method of transmitting a scheduling request signal together with an ACK/NACK signal according to still another embodiment of the present invention.

FIG. 12 shows a method of transmitting a scheduling request signal together with an ACK/NACK signal according to still another embodiment of the present invention. FIG. 12 shows an example of a MIMO with rank 2, in which an ACK/NACK signal is expressed as 2-bit. The horizontal axis is I channel (In-phase), and the vertical axis is Q channel (Quadrature-phase).

Referring to FIG. 12, an 8PSK structure of QPSK is used for an ACK/NACK signal of 2 bits and a scheduling request signal of 1 bit in QPSK modulation scheme. Each of the two bits configuring the ACK/NACK signal may be ACK/NACK signals for two data of a user. Unlike the case shown in FIG. 11, an ACK/NACK signal is modulated in QPSK modulation scheme to have four types of phases. When the scheduling request signal is simultaneously transmitted together with the ACK/NACK signal, the scheduling request signal can be transmitted together by rotating each of the four types of phases by a predetermined degree, e.g., 45 degrees.

In the figure, the constellation point marked with symbol + shows a case where only an ACK/NACK signal is transmitted, and the constellation point marked with symbol O shows a case where a scheduling request signal is transmitted together with an ACK/NACK signal.

Four constellation points of 45, 135, 225, 315 degrees are phases that the 2-bit ACK/NACK signal may have. The other four constellation points are phases that an ACK/NACK signal may have when the ACK/NACK signal is transmitted together with a scheduling request signal. Table 2 shows combinations of signals represented by each constellation point.

TABLE 2

| Phase of constellation point | ACK/NACK signal | Transmission of scheduling request signal |
| --- | --- | --- |
| 45 degrees | ACK, ACK | X |
| 90 degrees | ACK, ACK | O |
| 135 degrees | ACK, NACK | X |
| 180 degrees | ACK, NACK | O |
| 225 degrees | NACK, ACK | X |
| 270 degrees | NACK, ACK | O |
| 315 degrees | NACK, NACK | X |
| 360 or 0 degrees | NACK, NACK | O |

For example, when a user equipment transmits (ACK, NACK) as an ACK/NACK signal, it transmits a signal having a phase of 45 degrees. If the user equipment transmits a scheduling request signal together with (ACK, NACK), it can transmit a signal having a phase of 45 degrees after further delaying the signal as much as 45 degrees. Of course, the phases of constellation points according to respective combinations of signals and the phase degree delayed when a scheduling request signal is transmitted are merely an example and can be diversely set.

Next, described is a method of transmitting a scheduling request signal on a CQI channel when transmission contention occurs between CQI and the scheduling request signal in the CQI channel.

Figure 13:
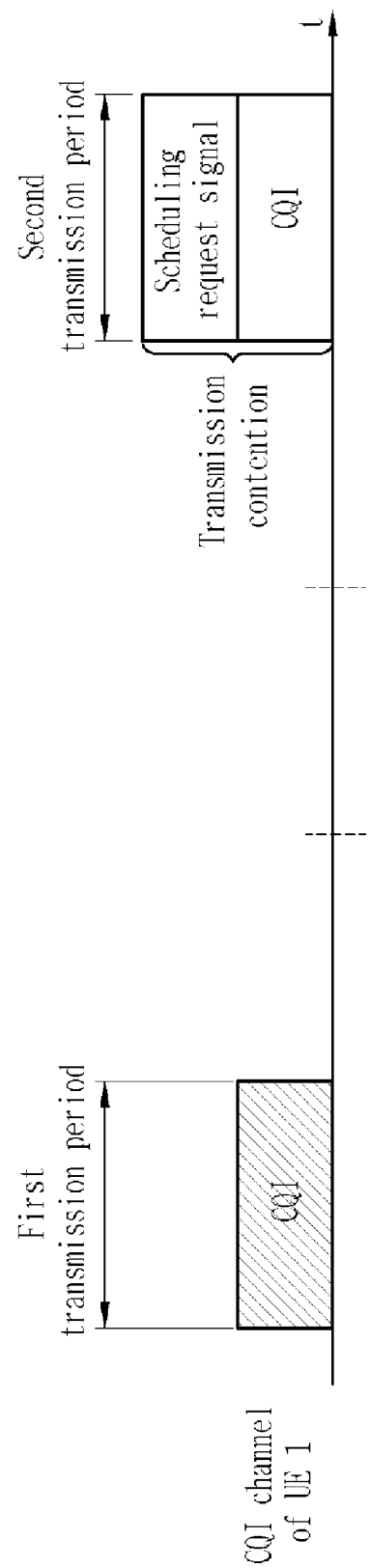
FIG. 13 shows an example of occurrence of transmission contention between CQI and scheduling request signal in a CQI channel.

FIG. 13 shows an example of occurrence of transmission contention between CQI and scheduling request signal in a CQI channel.

Referring to FIG. 13, UE1 transmits CQI using a sequence allocated to the first transmission period and releases the sequence allocation between the first and second transmission periods for other UEs. Since UE1 tries to simultaneously transmit CQI and a scheduling request signal in the second transmission period, transmission contention occurs in the second transmission period. The sequence used to transmit the scheduling request signal may be a sequence allocated to UE1 for CQI transmission or a dedicated sequence allocated for the scheduling request signal. The rule of allocating and releasing a sequence can be implemented in another method. Accordingly, the sequence allocation rule shown in the exemplary figure is merely an example.

In an embodiment, a scheduling request signal is transmitted preferentially to CQI. In most cases, since it is expected that transmission of a scheduling request signal has a priority higher than that of transmission of CQI, a user equipment transmits only a scheduling request signal when transmission contention occurs.

Figure 14:
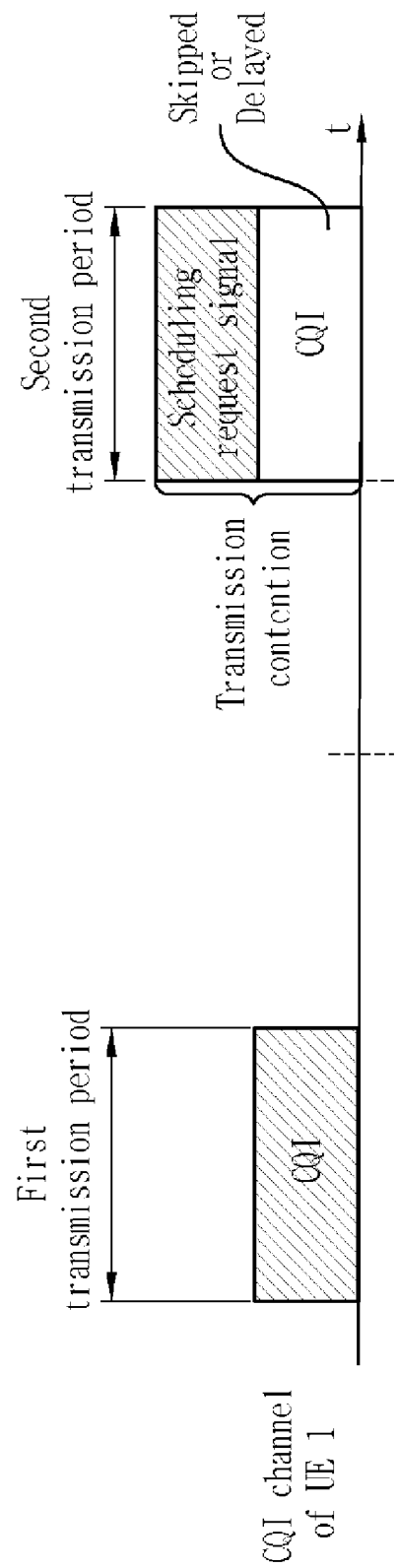
FIG. 14 shows a method of transmitting a scheduling request signal on a CQI channel according to an embodiment of the present invention.

FIG. 14 shows a method of transmitting a scheduling request signal on a CQI channel according to an embodiment of the present invention. CQI may be periodically transmitted at regular transmission intervals, or non-periodically transmitted without being restricted to a transmission interval. When the CQI is transmitted at regular intervals, each of a first to fourth transmission periods corresponds to a transmission interval. The transmission period may be referred to as a transmission timing.

Referring to FIG. 14, UE1 transmits CQI using a sequence allocated to the first transmission period and releases the allocated sequence between the first and second transmission periods for other UEs. Transmission contention occurs between a scheduling request signal and the CQI in the second transmission period. At this point, the scheduling request signal is transmitted preferentially to the CQI. The sequence used to transmit the scheduling request signal may be a sequence allocated to UE1 for CQI transmission or a dedicated sequence allocated for the scheduling request signal.

If the scheduling request signal is transmitted using a sequence allocated for CQI transmission, the base station makes an agreement with the user equipment or performs a blind decoding in order to know whether the user equipment transmits CQI or a scheduling request signal. The sequence allocation rule for reserving and releasing a sequence can be applied in another method, and the method shown in FIG. 14 is an example introduced for the convenience of explanation.

UE1 delays transmission of the CQI that is not transmitted in the second transmission period and transmits the CQI after a predetermined time or a unit control signal transmission time is elapsed, or UE1 skips transmission of the CQI. It is preferable that delay time of the CQI transmission is short. It is since that channel quality changes from time to time as time passes by, and thus previously measured CQI cannot correctly reflect the channel status if an extended period of time is elapsed.

In another embodiment, the user equipment determines priorities of the scheduling request signal and the CQI, and selects and transmits either of the signals.

Figure 15:
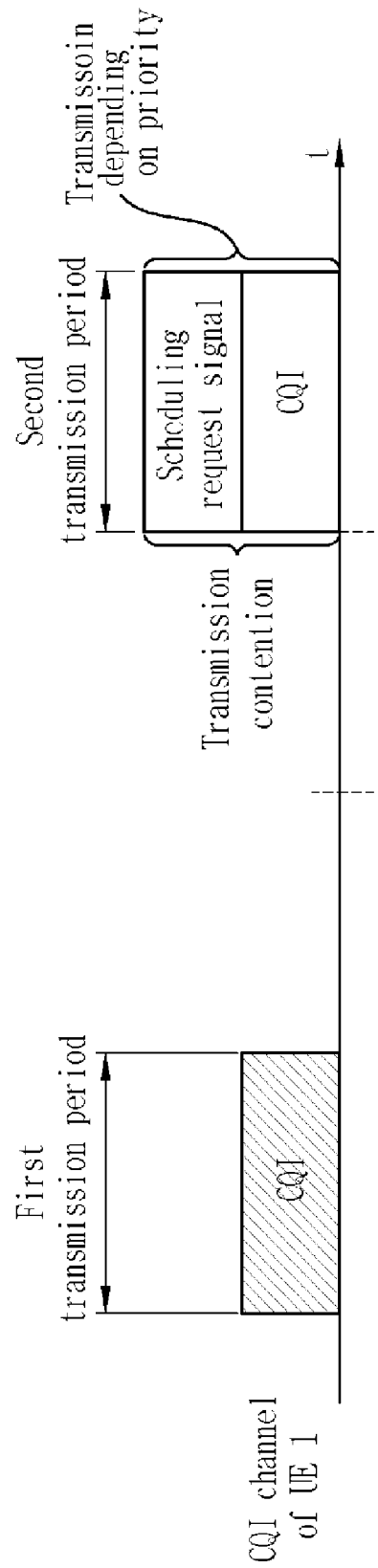
FIG. 15 shows a method of transmitting a scheduling request signal on a CQI channel according to another embodiment of the present invention.

FIG. 15 shows a method of transmitting a scheduling request signal on a CQI channel according to another embodiment of the present invention.

Referring to FIG. 15, transmission contention occurs in the second transmission period. The user equipment selects and transmits either of the signals in a method of determining a priority agreed with the base station.

The subject that determines the priority may be a user equipment or the base station. In the case where a user equipment determines the priority, when the user equipment by itself determines the priorities of the two signals and transmits either of the signals, the user equipment needs to transmit an additional signaling to the base station if the base station should know the information about basis of the determination. Or, the user equipment does not transmit an additional signaling, and the base station itself may distinguish CQI from a scheduling request signal in a blind method.

In the case where the base station determines the priorities, the base station should inform the user equipment of the information on the determination of the priorities. Accordingly, transmission of various kinds of additional information is needed. In the method of transmitting any one of signals depending on the additional when transmission contention occurs, the system can operate in a form that is most appropriate to a downlink service related to CQI and an uplink service related to a scheduling request signal.

If the scheduling request signal is transmitted in the second transmission period, UE1 delays transmission of the CQI that is not transmitted in the second transmission period and transmits the CQI after a predetermined time or a unit control signal transmission time is elapsed, or UE1 skips transmission of the CQI.

If the CQI is transmitted in the second transmission period, UE1 transmits the scheduling request signal in the transmission period of the next control signal, or transmits a new scheduling request signal. At this point, the sequence used for the scheduling request signal may be a dedicated sequence.

In yet another embodiment, a user equipment selects and transmits a signal based on a predetermined selection rule. It is the principle of the selection rule to preferentially transmit CQI and then transmit a scheduling request signal after delaying the scheduling request signal for a predetermined time period. Exceptionally, the scheduling request signal is transmitted prior to the CQI although transmission contention occurs only if the number of delays of the scheduling request signal (hereinafter, referred to as a delay count) caused by transmission contention is equal to a critical delay count. In this exceptional case, the user equipment retransmits the CQI.

Figure 16:
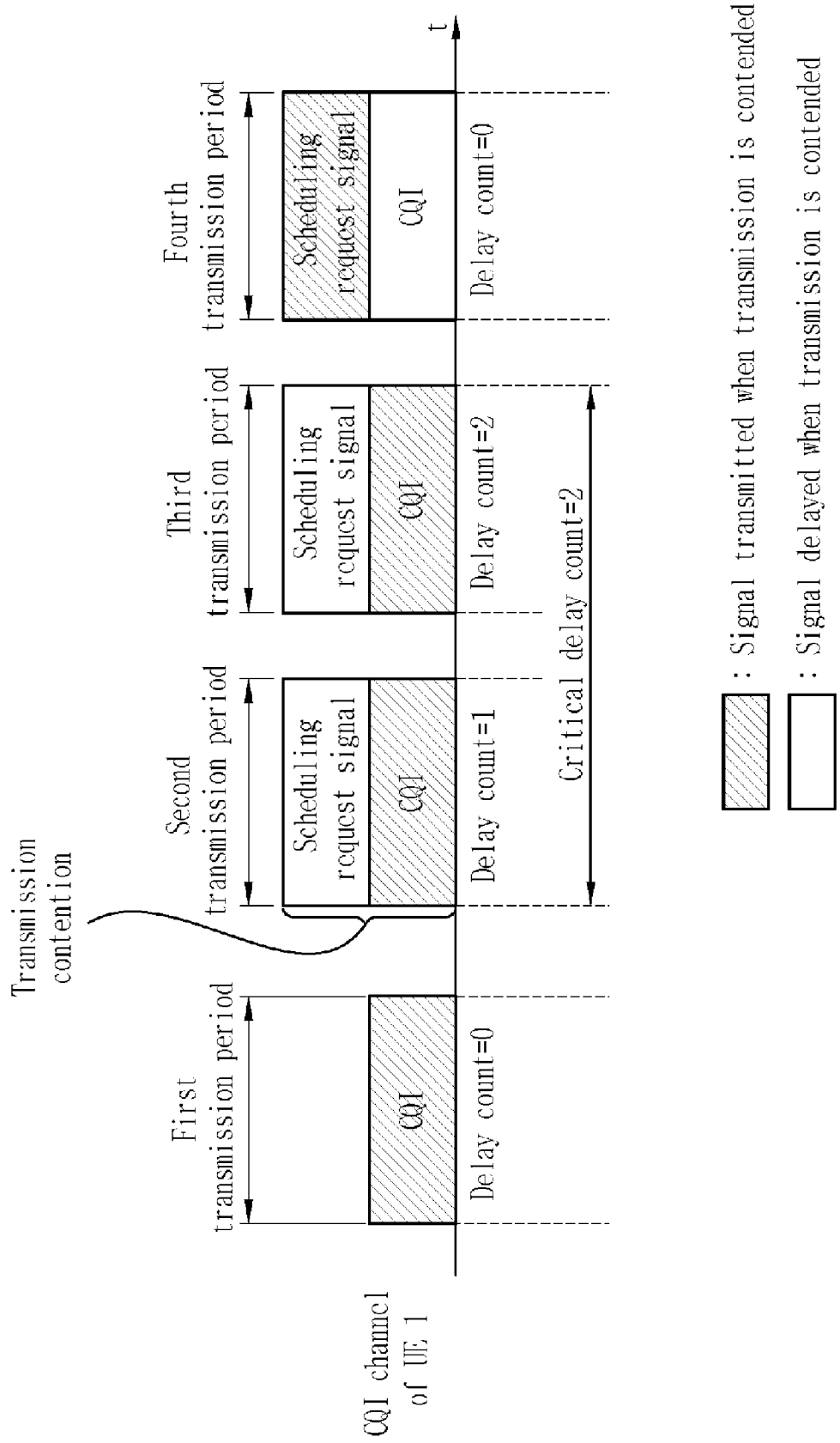
FIG. 16 shows a method of transmitting a scheduling request signal based on a selection rule on a CQI channel according to an embodiment of the present invention.

FIG. 16 shows a method of transmitting a scheduling request signal based on a selection rule on a CQI channel according to an embodiment of the present invention.

Referring to FIG. 16, UE1 having a critical delay count of 2 transmits CQI in the first transmission period. At this time, the delay count is 0. When UE1 transmits a scheduling request signal in the second transmission period, transmission contention with the CQI occurs. Since the delay count is 0, it is smaller than the critical delay count of 2. Accordingly, UE1 delays transmission of the scheduling request signal and transmits the CQI. At this time, the delay count becomes 1.

When UE1 transmits a scheduling request signal again in the third transmission period, transmission contention with CQI occurs. Since the delay count is 1, it is still smaller than the critical delay count of 2. Accordingly, UE1 delays transmission of the scheduling request signal again and transmits the CQI. At this time, the delay count becomes 2.

When UE1 transmits a scheduling request signal again in the fourth transmission period, transmission contention with CQI occurs. Since the delay count is 2, it is equal to the critical delay count of 2. Therefore, UE1 delays transmission of the CQI and transmits the scheduling request signal. Since UE1 transmits the scheduling request signal, the delay count becomes 0 again.

It is apparent that the critical delay count of the selection rule can be differently set depending on system status. The sequence used to transmit the scheduling request signal may be a sequence allocated to UE1 for CQI transmission or a dedicated sequence allocated for the scheduling request signal.

If the scheduling request signal is transmitted using a sequence allocated for CQI transmission, the base station makes an agreement with the user equipment or performs a blind decoding in order to know whether the user equipment transmits CQI or a scheduling request signal.

Figure 17:
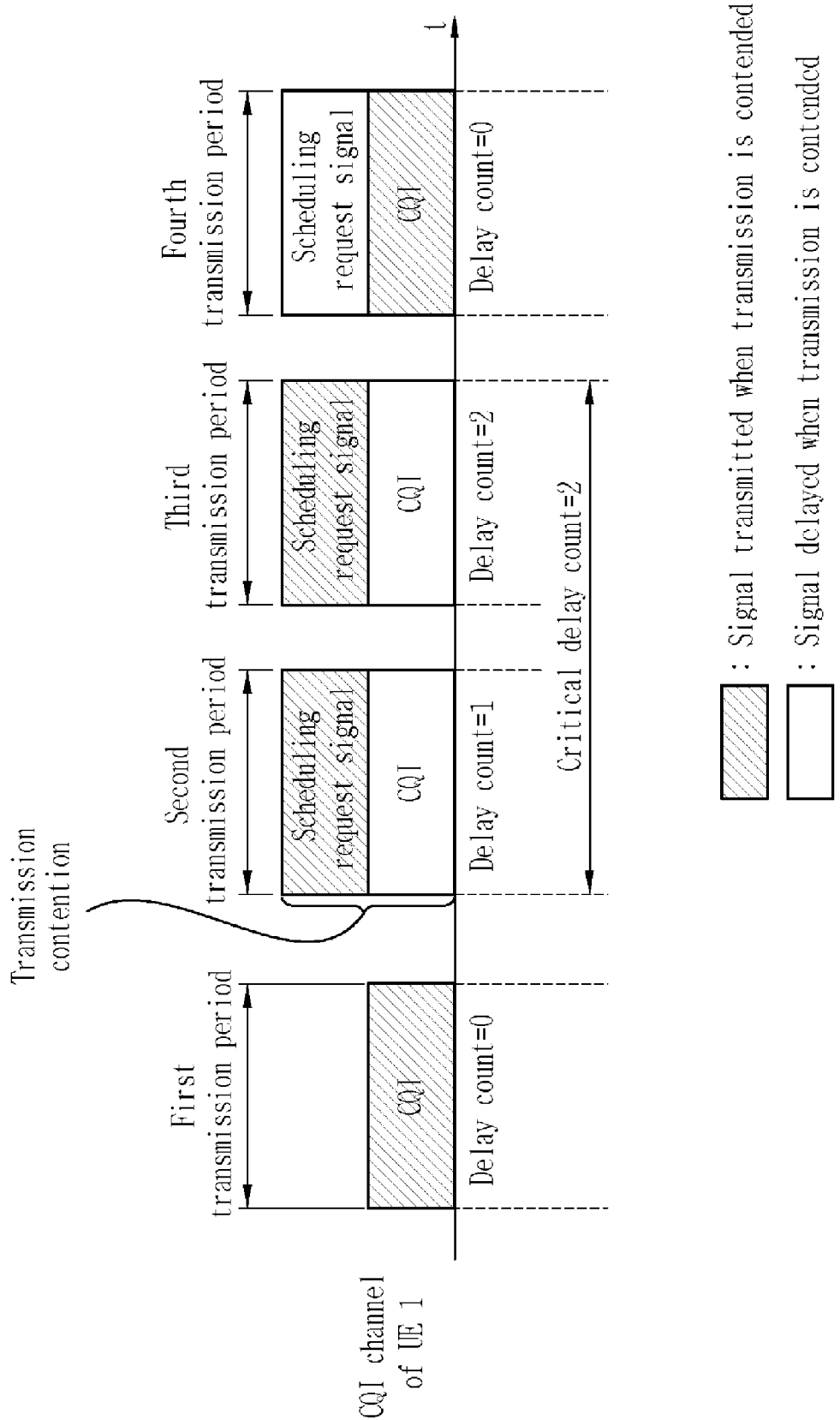
FIG. 17 shows a method of transmitting a scheduling request signal based on a selection rule on a CQI channel according to another embodiment of the present invention.

FIG. 17 shows a method of transmitting a scheduling request signal based on a selection rule on a CQI channel according to another embodiment of the present invention.

Referring to FIG. 17, UE1 delays the CQI as many times as the critical delay count and transmits the scheduling request signal. However, if the delay count of the CQI is equal to the critical delay count, the CQI is transmitted. The sequence used to transmit the scheduling request signal may be a sequence allocated to UE1 for CQI transmission or a dedicated sequence allocated for the scheduling request signal. If the scheduling request signal is transmitted using a sequence allocated for CQI transmission, the base station makes an agreement with the user equipment or performs a blind decoding in order to know whether the user equipment transmits CQI or a scheduling request signal.

Finally, described below is a method of transmitting only a scheduling request signal on the same physical channel structure with an ACK/NACK channel or CQI channel.

Figure 18:
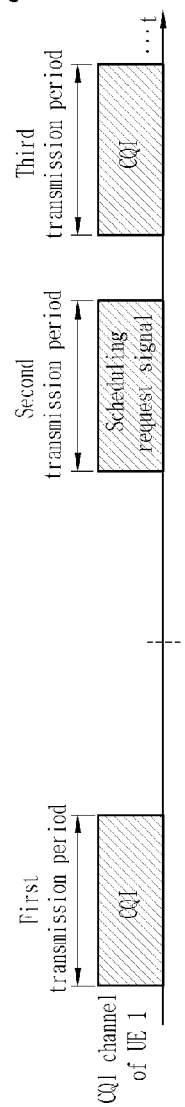
FIG. 18 shows an example of transmitting only a scheduling request signal on a control channel.

FIG. 18 shows an example of transmitting only a scheduling request signal on a control channel.

Referring to FIG. 18, a process of UE1 for transmitting CQI and a scheduling request signal on a CQI channel is shown. A sequence is allocated to transmit the CQI or scheduling request signal of UE1, or the sequence allocated to the UE1 is released for other UEs. UE1 transmits CQI in the first transmission period, a scheduling request signal in the second transmission period, and CQI in the third transmission period. That is, transmission contention does not occur among control signals transmitted by UE1.

Figure 19:
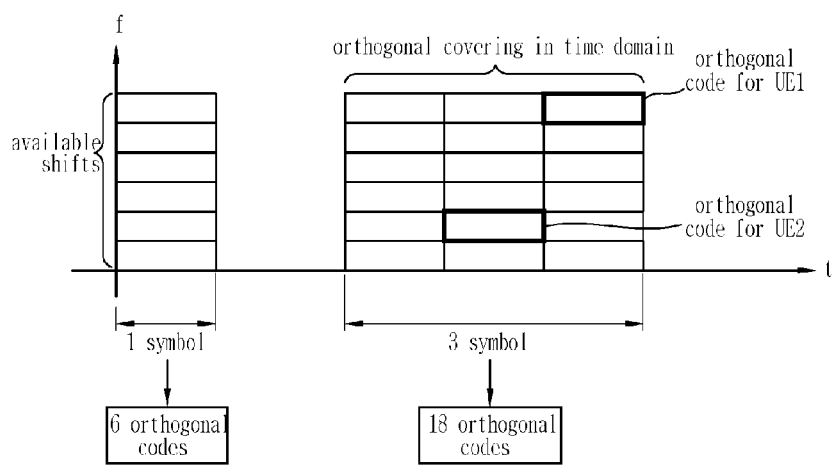
FIG. 19 shows a method of transmitting a scheduling request signal on the same physical channel structure with ACK/NACK channel according to an embodiment of the present invention.

FIG. 19 shows a method of transmitting a scheduling request signal on a same physical channel structure with an ACK/NACK channel according to an embodiment of the present invention. Hereinafter, it is assumed that ZC CAZAC sequences are used in the frequency domain and orthogonal covering sequences (OC) are used in the time domain.

Referring to FIG. 19, six ZC CAZAC sequences maintain orthogonality one another using cyclic shifts, and respective ZC CAZAC cyclic shifts are subsequently spread by orthogonal covering sequences in the time domain and maintain orthogonality one another again. That is, spreading codes can be applied to each SC-FDMA symbol in the time domain.

At this time, for coherent detection, the number of orthogonal covering sequences that can be used for each cyclic shift is determined by the function of min (the number of SC-FDMA symbols in the data region, the number of SC-FDMA symbols in the reference signal region). In the coherent detection, a transmission signal, i.e., constellation of an ACK/NACK signal, is distinguished based on a defined reference signal. Since the number of SC-FDMA symbols for data is four and the number of SC-FDMA symbols for the reference signal is three in a slot, maximum three orthogonal covering sequences are possible for the coherent detection. That means a scheduling reference signal can be spread in time domain by an orthogonal covering sequence of maximum length three.

Accordingly, if n cyclic shifts are used as a scheduling request signal in the coherent detection, maximum 3n user equipments can simultaneously transmit a scheduling request signal in a slot.

Hereinafter, a code generated by applying an orthogonal covering sequence to each of the ZC CAZAC sequences in the time domain is referred to as an orthogonal code. As shown in FIG. 19, if there are six ZC CAZAC sequences in the frequency domain and each of the six ZC CAZAC sequences is spread across three SC-FDMA symbols in the time domain, the number of possible orthogonal codes is 6×3=18. If the ZC CAZAC sequence is not spread in the time domain, the number of possible orthogonal codes is six.

Sine the eighteen orthogonal codes are orthogonal to one another, if at least one of the orthogonal codes among the eighteen orthogonal codes is allocated to a specific UE for a scheduling request, maximum eighteen UEs can transmit the scheduling request signal in a slot. Of course, the number of possible orthogonal codes can be changed, and two or more orthogonal codes can be allocated to each UE for the scheduling request signal. If a specific orthogonal code is allocated to UE1 for an ACK/NACK signal in an ACK/NACK channel, an orthogonal code different from the specific orthogonal code is allocated to UE2 for a scheduling request signal.

Although six cyclic shifts are assumed using ZC CAZAC sequences in the frequency domain, this is merely an example, and other effective sequences can be used, or the cyclic shifts may be six or more.

Figure 20:
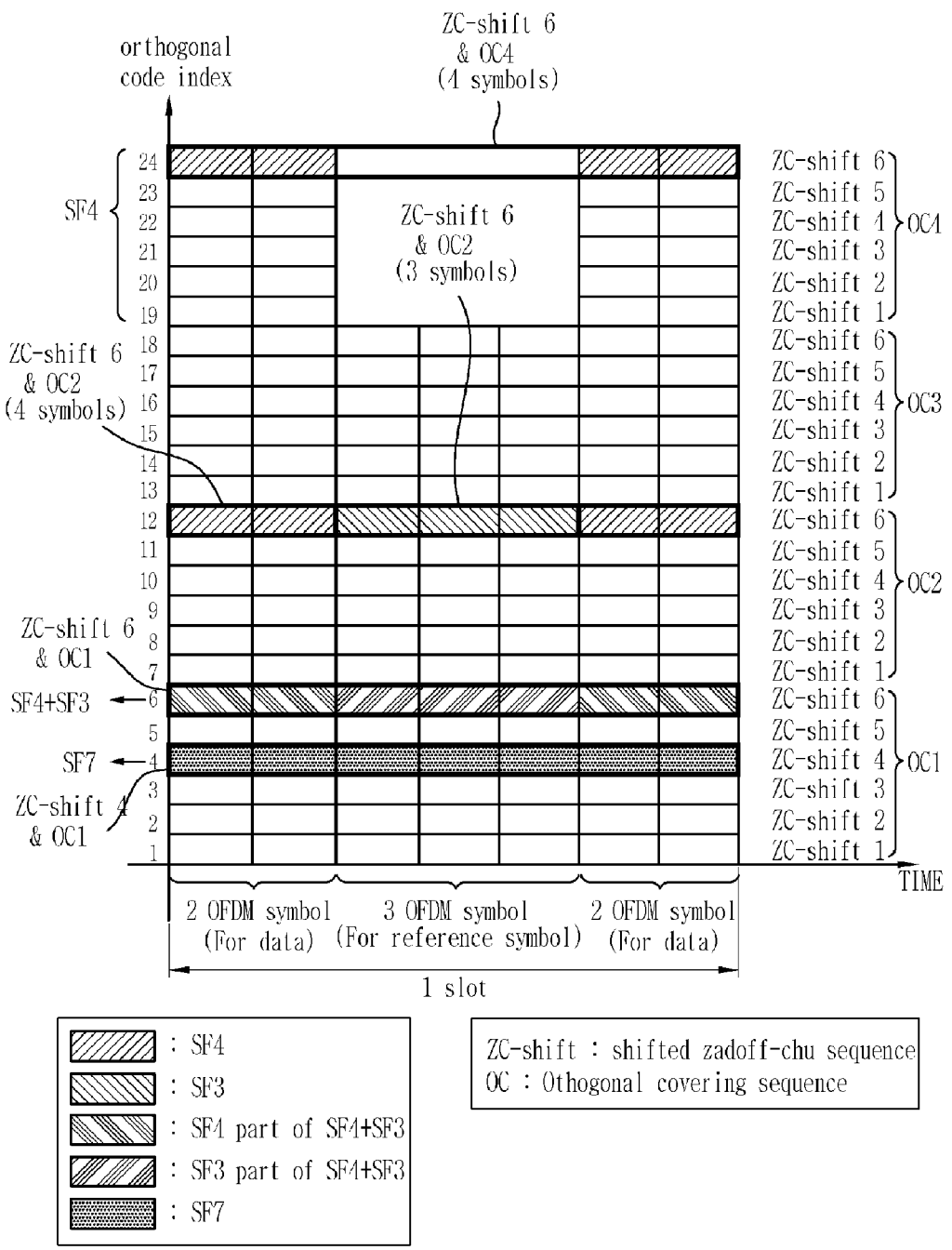
FIG. 20 shows a method of transmitting a scheduling request signal on the same physical channel structure with ACK/NACK channel according to another embodiment of the present invention.

FIG. 20 shows a method of transmitting a scheduling request signal on the same physical channel structure with ACK/NACK channel according to another embodiment of the present invention. The horizontal axis is a time axis, which expresses the number of OFDM or SC-FDMA symbols, and the vertical axis is an index of an orthogonal code.

Referring to FIG. 20, there can be four types of slot structures according to the length of orthogonal covering sequence which is spread in a slot.

The first slot structure is related to a method of using six orthogonal code indexes for scheduling request signals that cannot be allocated for an ACK/NACK signal, among all orthogonal code indexes. Since the ACK/NACK signal is in a coherent relation with the reference signal, if the reference signal is not included in an ACK/NACK channel, the receiver cannot detect the ACK/NACK signal. On the other hand, a scheduling request signal can be detected only by detecting presence or absence of the scheduling request signal (in other means, presence or absence of energy) regardless of the reference signal. That is, the scheduling request signal can be detected in a coherent or non-coherent method. Such a difference between the ACK/NACK signal and scheduling request signal can be considered to be caused by difference in the methods of allocating symbols and sequences. Accordingly, even an orthogonal code that cannot be allocated for an ACK/NACK signal can be allocated for a scheduling request signal.

Orthogonal code indexes 19 to 24 are SF4 slot structures. The SF4 slot structure is made by applying orthogonal covering sequence to four OFDM symbols for data except three OFDM symbols for a reference signal (the third, fourth, and fifth OFDM symbols).

Since a reference signal of an ACK/NACK channel uses three OFDM symbols, the number of possible orthogonal codes allocated for the reference signal of the ACK/NACK signal is 3 (a spreading factor or the number of symbols)×6 (cyclic shifts)=18. Since the data region of the ACK/NACK channel uses four OFDM symbols, the number of possible orthogonal codes that can be allocated for data of the ACK/NACK signal is 4 (a spreading factor or the number of symbols)×6 (cyclic shifts)=24. In the coherent detection, since min(18, 24)=18 (orthogonal code indexes 1 to 18), the other six orthogonal codes (orthogonal code indexes 19 to 24) cannot transmit the reference signal (i.e., the six orthogonal codes should be detected in the non-coherent method), and thus they cannot be allocated for an ACK/NACK signal. Accordingly, the other six orthogonal codes can be allocated for a scheduling request signal. Accordingly, the other six orthogonal codes can be used as dedicated sequences for the scheduling request signal. For example, orthogonal code index 24 is a combination of ZC_Shift6 and orthogonal covering sequence OC 4, which is an example of SF4.

The second slot structure is made by using some of orthogonal codes allocated to the reference signal region of an ACK/NACK channel (3 OFDM symbols, SF3) as a dedicated or shared sequence for a scheduling request signal. This is referred to as an SF3 slot structure. Orthogonal code indexes 1 to 18 are SF3 slot structures, which can be used for a scheduling request signal. For example, orthogonal code index 12 is a combination of ZC_Shift6 and orthogonal covering sequence OC 2, which is an example of SF3.

The third slot structure is made by using some of orthogonal codes allocated to the data region of an ACK/NACK channel (4 OFDM symbols, SF4) as a dedicated sequence for a scheduling request signal. The third slot structure is an SF4 slot structure, which is the same as the first slot structure.

Since a reference signal of an ACK/NACK channel uses three OFDM symbols, the number of possible orthogonal codes allocated for the reference signal of the ACK/NACK signal is 3 (a spreading factor or the number of symbols)×6 (cyclic shifts)=18. Since the data region of the ACK/NACK channel uses four OFDM symbols, the number of possible orthogonal codes that can be allocated for data of the ACK/NACK signal is 4 (a spreading factor or the number of symbols)×6 (cyclic shifts)=24. In the coherent detection, since min(18, 24)=18, orthogonal code indexes 1 to 18 can be allocated for an ACK/NACK signal. For example, orthogonal code index 12 is a combination of ZC_Shift6 and orthogonal covering sequence OC 2, which is an example of SF4.

Unlike the first slot structure (in the case of orthogonal code 24) where all of the orthogonal code indexes 19 to 24 are allocated for a scheduling request signal, the third slot structure can use all the eighteen orthogonal codes for an ACK/NACK signal and scheduling request signal. However, in this case, the scheduling request signal can be detected by coherent detection.

The fourth slot structure is made by orthogonally covering the data region and reference signal regions by SF4 and SF3 respectively. This slot structure is referred to as SF4+SF3 structure. If a UE transmits the scheduling request signal by using the SF4+SF3 structure, the base station can restore the scheduling request signal by separately decovering each signal. For example, orthogonal code index 06 is a combination of ZC_Shift6 and orthogonal covering sequence OC 1, which is an example of SF4+SF3.

Figure 21:
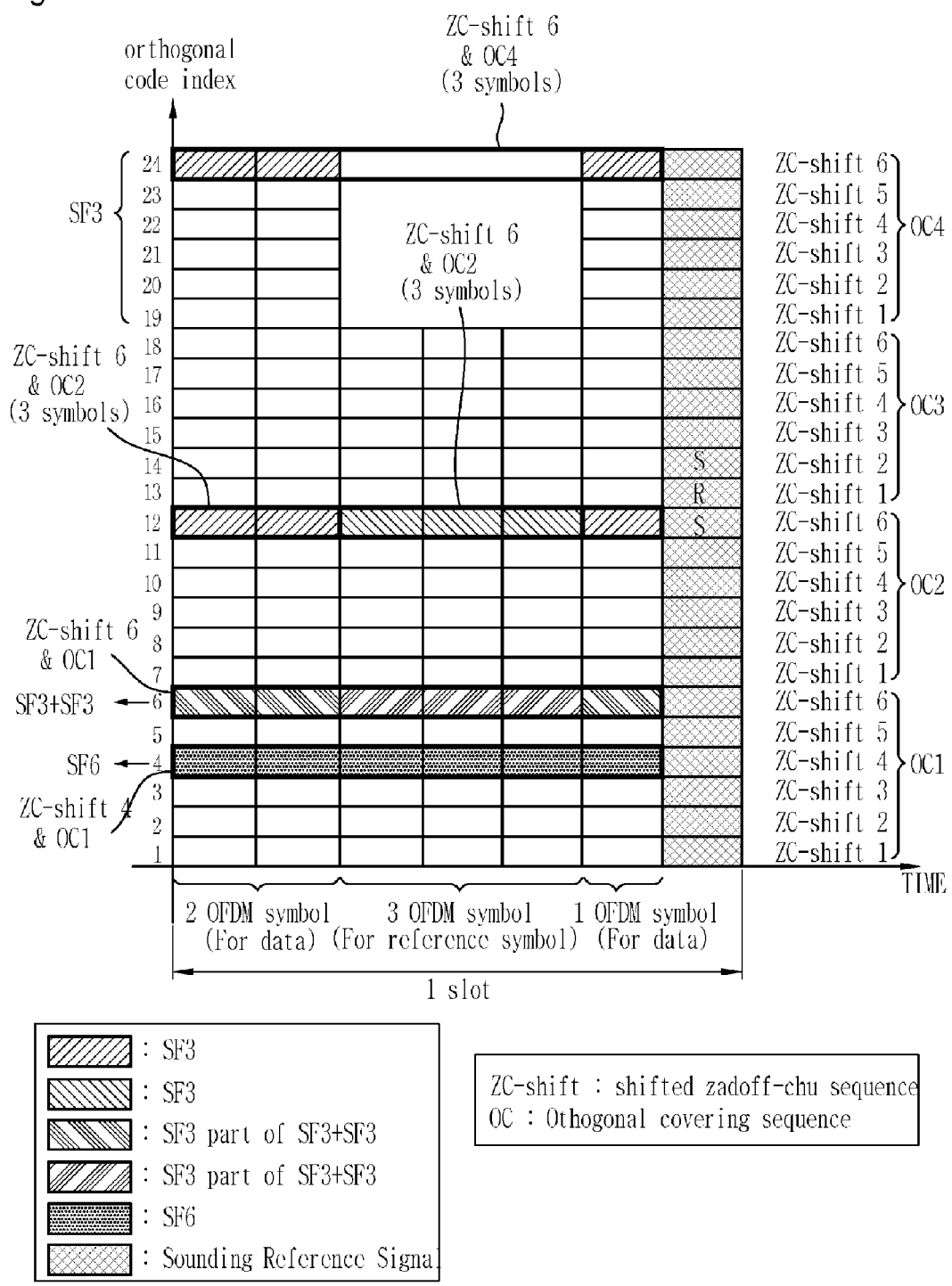
FIG. 21 shows a method of transmitting a scheduling request signal on the same physical channel structure with ACK/NACK channel according to still another embodiment of the present invention.

FIG. 21 shows a method of transmitting a scheduling request signal on the same physical channel structure with ACK/NACK channel according to still another embodiment of the present invention. Unlike the method shown in FIG. 20, FIG. 21 shows an example considering a case where an sounding reference signal (SRS), which is an uplink reference signal for uplink scheduling, is transmitted on at least one SC-FDMA symbol.

Referring to FIG. 21, a slot is configured with seven OFDM symbols, and the seventh SC-FDMA symbol is allocated (or puctured) for sounding reference signal. Accordingly, time domain spreading can be performed across maximum six SC-FDMA symbols. This format of PUCCH is referred to as a shortened PUCCH format. There can be four types of slot structure according to the length of orthogonal covering sequence which is spread in a slot.

The first slot structure is an SF3 slot structure in orthogonal code indexes 19 to 24. Since the first slot structure is based on non-coherent detection, six orthogonal indexes that cannot be allocated for an ACK/NACK signal can be allocated for a scheduling request signal.

The second slot structure is an SF3 slot structure in orthogonal code indexes 1 to 18. Since time domain orthogonal covering is performed across three SC-FDMA symbols allocated for data of an ACK/NACK channel or three SC-FDMA symbols allocated for a reference signal of an ACK/NACK channel, orthogonal codes of maximum 3 (the number symbols or a spreading factor)×6 (cyclic shifts)=18 can be obtained in each case. Some of the eighteen orthogonal codes can be allocated for an ACK/NACK signal, and some of the other orthogonal codes can be allocated for a scheduling request signal (at this point, a sequence can be a dedicated sequence).

The third slot structure is an SF3+SF3 slot structure, and the fourth slot structure is an SF6 slot structure. That is, unlike the method shown in FIG. 20, orthogonal codes corresponding to an amount as much as one OFDM symbol is reduced from the length of time domain orthogonal covering can be obtained.

Of course, the position of an SC-FDMA symbol allocated for a sounding reference signal (SRS) can be other than that of the seventh SC-FDMA symbol, and the number of SC-FDMA symbols allocated for the sounding reference signal can be one or more. The slot structure can be changed depending on the number and positions of the SC-FDMA symbols for the sounding reference signal.

Hereinafter, a method of allocating a separate dedicated resource block to a scheduling request signal will be described.

Resource blocks can be categorized as described below. That is, there may be a resource block for transmitting only an ACK/NACK signal, a resource block for transmitting an ACK/NACK signal and a scheduling request signal, and a resource block for transmitting only a scheduling request signal using an SF7 slot structure (an SF6 slot structure in a slot where a sounding reference signal is added). Here, it is operated to transmit only scheduling request signals in resource blocks dedicated to scheduling request signals.

At this point, the scheduling request signal may be operated in a non-coherent method, or in a coherent method by allocating a reference signal for a scheduling request signal to some symbols.

Figure 22:
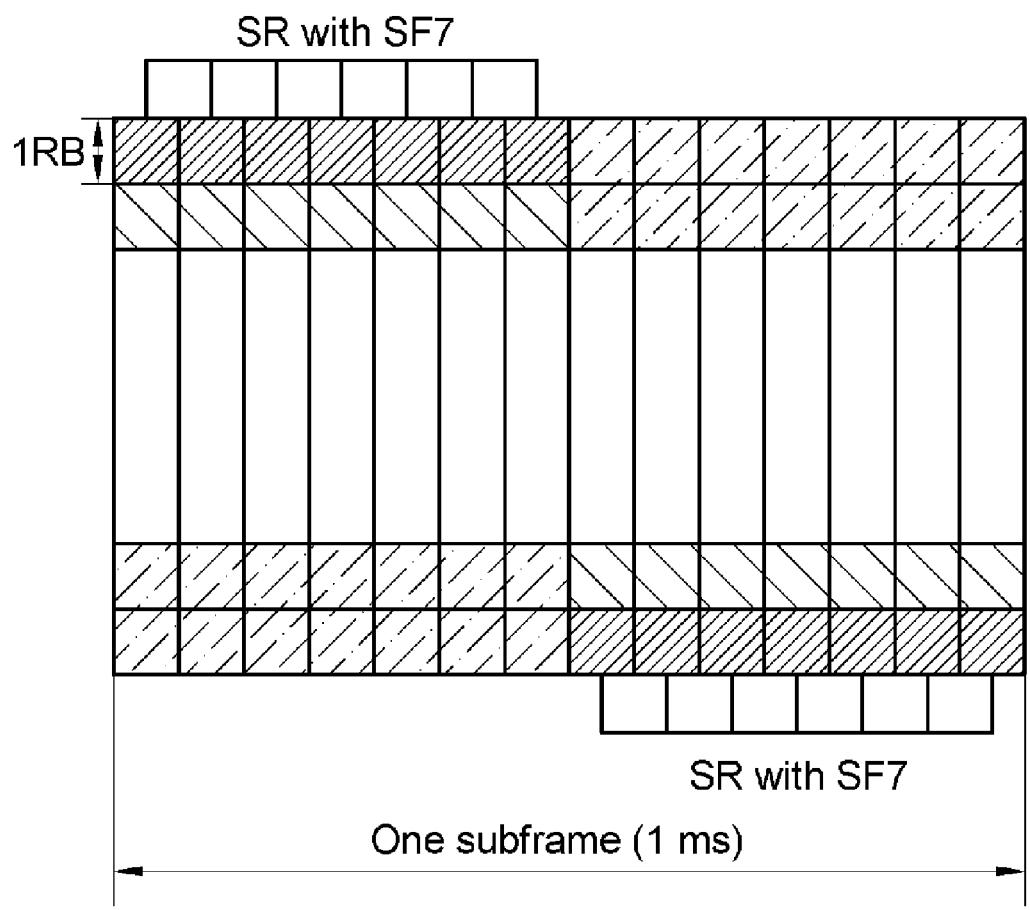
FIG. 22 shows a method of transmitting a scheduling request signal in one subframe according to an embodiment of the present invention.

FIG. 22 shows a method of transmitting a scheduling request signal in one subframe according to an embodiment of the present invention.

Referring to FIG. 22, one subframe is configured with a plurality of resource blocks. Each resource block can be any one of a resource block for a scheduling request signal, a resource block for an ACK/NACK signal, and a shared resource block for a scheduling request signal and an ACK/NACK signal. Since a sounding reference signal SRS is not transmitted in both of the two slots configuring one subframe, a scheduling request signal can be transmitted in a slot structure of SF7.

Figure 23:
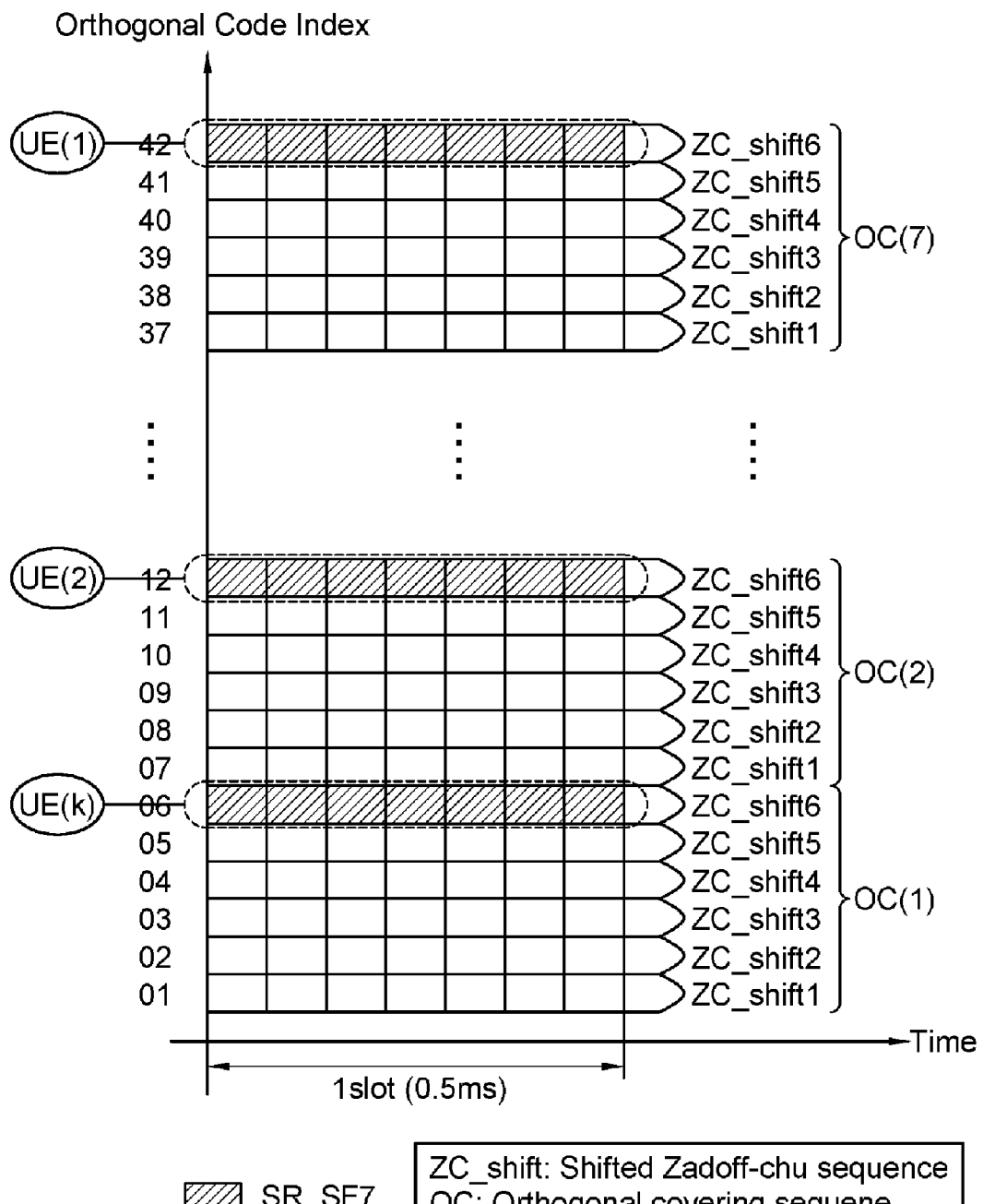
FIG. 23 shows orthogonal code indexes that can be allocated in a resource block for a scheduling request signal according to an embodiment of the present invention.

FIG. 23 shows orthogonal code indexes that can be allocated in a resource block for a scheduling request signal according to an embodiment of the present invention.

Referring to FIG. 23, since there is no sounding reference signal, a scheduling request signal can be transmitted using a SF7 slot structure. If one resource block can be entirely allocated to a scheduling request signal, the number of UEs multiplexed in the SF7 slot structure as shown in FIG. 23 can be as many as 6 (cyclic shifts)×7 (orthogonal covering sequences)=42 according to a non-coherent method. Accordingly, compared with a resource block shared by other control signals, further more scheduling request signals can be transmitted.

For example, UE1 may transmit a scheduling request signal by a combination of ZC_Shift6 and orthogonal covering sequence OC 7, UE2 may transmit a scheduling request signal in a combination of ZC_Shift6 and orthogonal covering sequence OC 2, and UE3 may transmit a scheduling request signal by a combination of ZC_Shift6 and orthogonal covering sequence OC 1. In this manner, orthogonal code indexes used as a scheduling request signal can be assigned to maximum 42 UEs.

Figure 24:
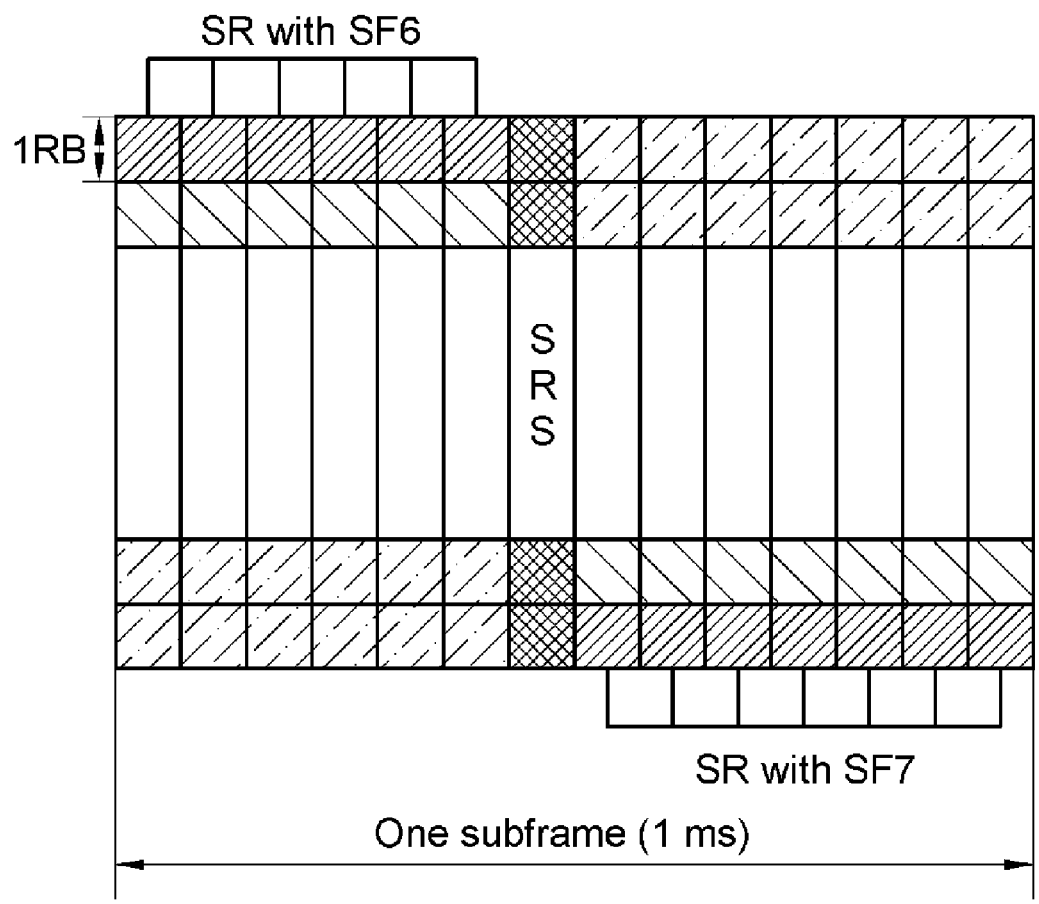
FIG. 24 shows resource blocks for a scheduling request signal according to an embodiment of the present invention.

FIG. 24 shows resource blocks for a scheduling request signal according to an embodiment of the present invention.

Referring to FIG. 24, unlike the example of FIG. 22, a sounding reference signal is included in a first slot of one subframe. A scheduling request signal can be transmitted using the SF6 slot structure or SF3+SF3 slot structure in the first slot, and can be transmitted using the SF7 slot structure or SF3+SF4 slot structure in a second slot. The SF3+SF4 slot structure is made by orthogonally covering the scheduling request signal over the data region and reference signal regions by SF3 and SF4 respectively in the second slot. That is, different length of orthogonal covering sequence is used for data region and reference signal regions in the second slot. Of course, the position of an SC-FDMA symbol allocated for a sounding reference signal (SRS) can be other than that of the seventh SC-FDMA symbol. SF3, SF4, SF6, SF7 and SF3+SF4 is explained in FIG. 20 and FIG. 21 in detail.

Figure 25:
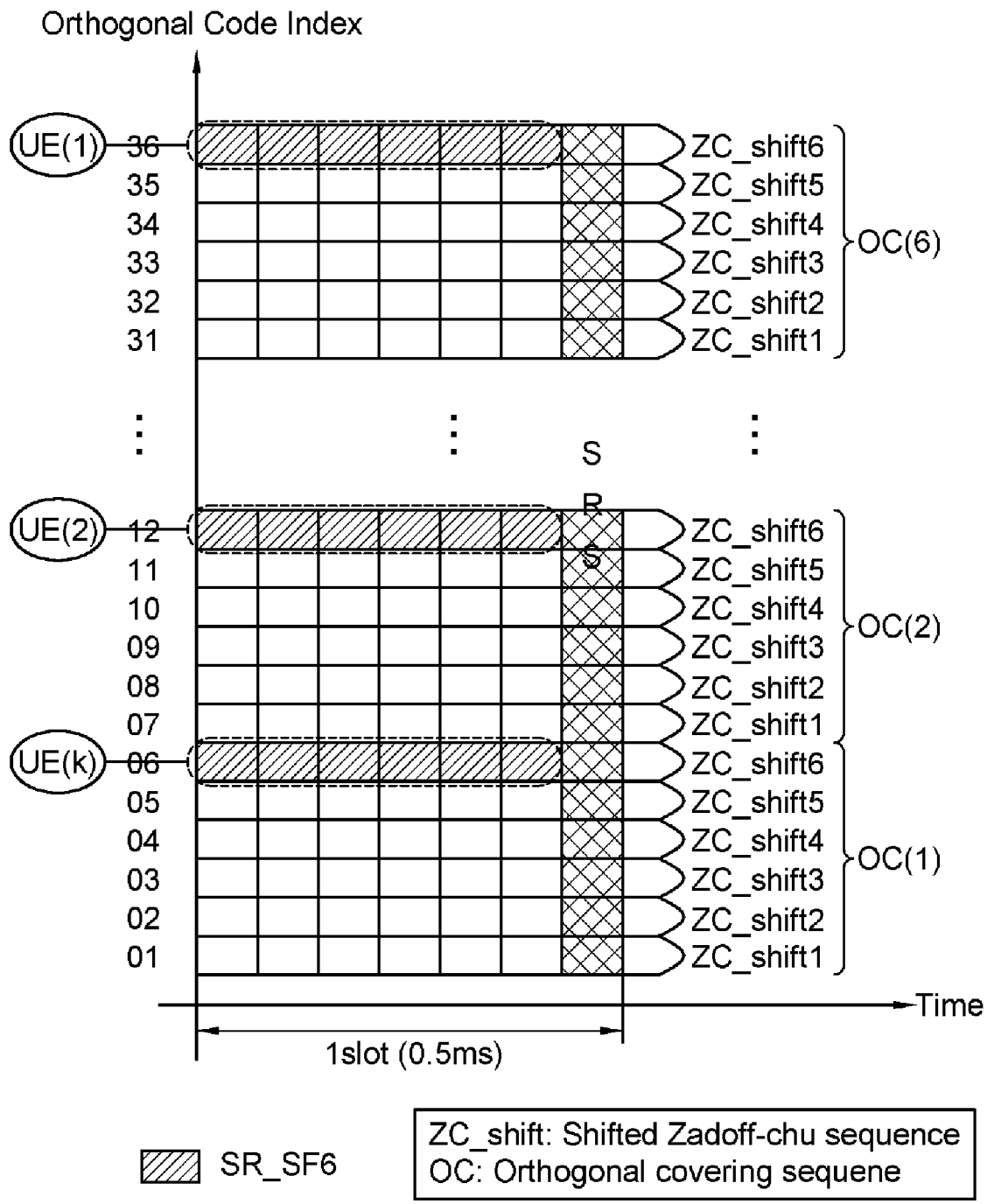
FIG. 25 shows orthogonal code indexes that can be allocated in a resource block for a scheduling request signal according to another embodiment of the present invention.

FIG. 25 shows orthogonal code indexes that can be allocated in a resource block for a scheduling request signal according to another embodiment of the present invention.

Referring to FIG. 25, since a sounding reference signal is transmitted, a scheduling request signal can be transmitted using the SF6 slot structure. If one resource block can be entirely allocated to a scheduling request signal, the number of UEs multiplexed in the SF6 slot structure as shown in FIG. 25 can be as many as 6 (cyclic shifts)×6 (orthogonal covering sequences)=36 according to a non-coherent method.

Figure 26:
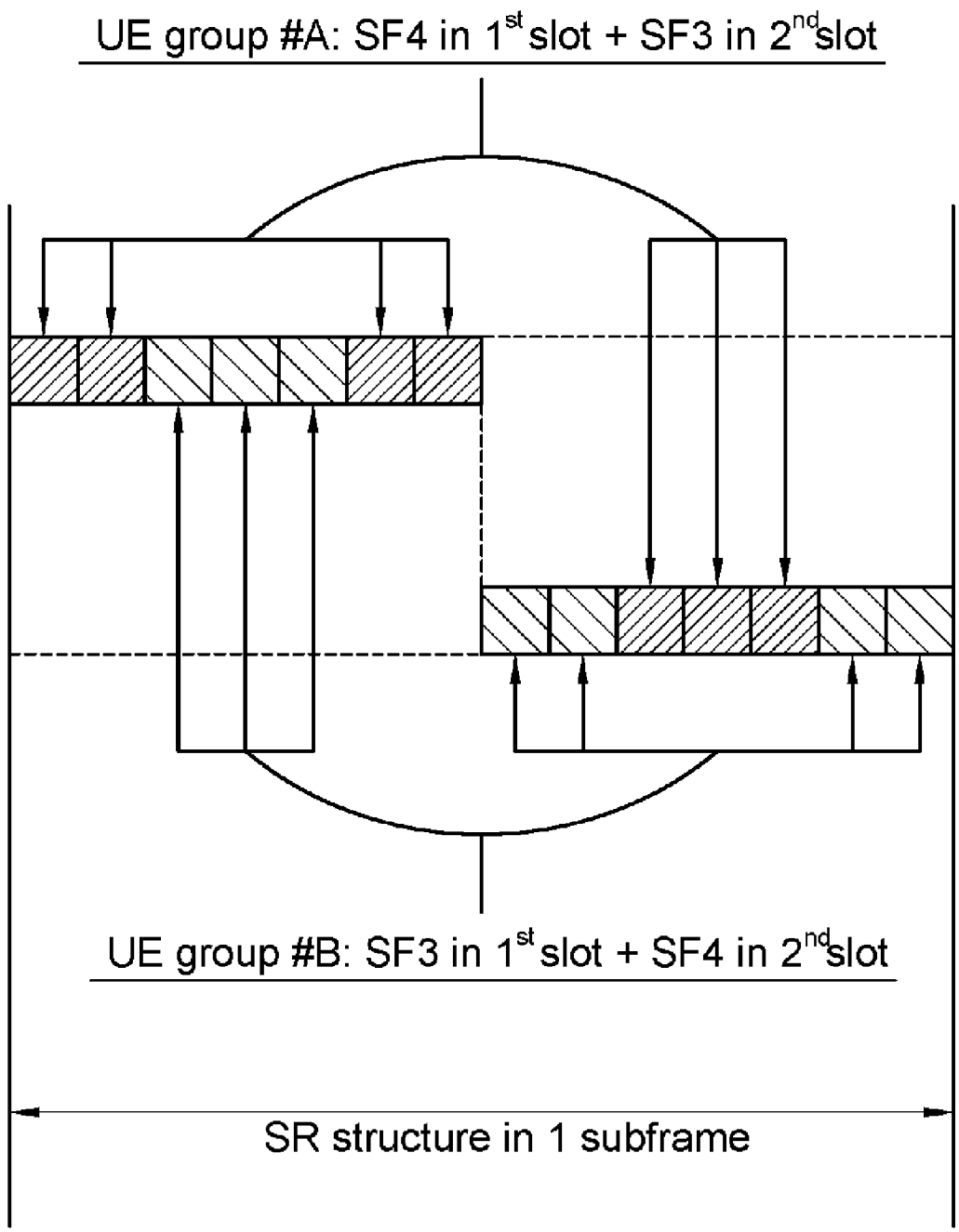
FIG. 26 shows a method of transmitting a scheduling request signal in one subframe according to another embodiment of the present invention.

FIG. 26 shows a method of transmitting a scheduling request signal in one subframe according to another embodiment of the present invention. It is assumed that the subframe structure is the same as the subframe structure shown in FIG. 3.

Referring to FIG. 26, since three OFDM symbols in the middle of the upper ACK/NACK channel of a first slot and OFDM symbols of two respectively positioned at the left and right sides of the lower ACK/NACK channel of a second slot form one SF3+SF4 structure (hereinafter, referred to as a first structure), a scheduling request signal can be transmitted using orthogonal codes obtained from the first structure. The method described referring to FIGS. 19 to 21 can be referenced for the method of transmitting an ACK/NACK signal or a scheduling request signal using the SF3+SF4 structure.

In addition, since OFDM symbols of two positioned at the left and right sides of the upper ACK/NACK channel of the first slot and three OFDM symbols in the middle of the lower ACK/NACK channel of the second slot form one SF4+SF3 structure (the same as the SF3+SF4 structure) (hereinafter, referred to as a second structure), a scheduling request signal can be transmitted using orthogonal codes obtained from the second structure.

The first and second structures are channel structures formed by combining some OFDM symbols taken from the first and second slots within the subframe. It is not necessarily limited to the SF3+SF4 structure formed as shown in the figure, but it is apparent that the number and positions of the OFDM symbols taken from each slot can be changed.

It is assumed that a group of users using the first structure is referred to as group A, and a group of users using the second structure is referred to as group B. All users belonging group A can transmit a scheduling request signal configured with seven OFDM symbols within one subframe using the SF4 (the first slot)+SF3 (the second slot) structure. In addition, all users belonging group B can transmit a scheduling request signal configured with seven OFDM symbols within one subframe using the SF3 (the first slot)+SF4 (the second slot) structure.

Orthogonal codes allocated to one scheduling request signal may be different in each slot within one subframe, and the orthogonal codes can be paired between the groups. For example, for a user in group A, orthogonal code 1 of the first slot (SF4 portion) and orthogonal code 1 of the second slot (SF3 portion) can be used to transmit a scheduling request signal. On the other hand, for a user in group B, orthogonal code 1 of the first slot (SF3 portion) and orthogonal code 1 of the second slot (SF4 portion) can be used to transmit a scheduling request signal.

Table 3 shows orthogonal codes pairing with each other between groups.

TABLE 3

| | | First Slot | Second Slot |
|---|---|---|---|
| Group A | User 1 | SF3(Orthogonal Code 1) | SF4(Orthogonal Code 1) |
| Group B | User 4 | SF4(Orthogonal Code 1) | SF3(Orthogonal Code 1) |
| Group A | User 2 | SF3(Orthogonal Code 2) | SF4(Orthogonal Code 2) |
| Group B | User 5 | SF4(Orthogonal Code 2) | SF3(Orthogonal Code 2) |
| Group A | User 3 | SF3(Orthogonal Code 3) | SF4(Orthogonal Code 3) |
| Group B | User 6 | SF4(Orthogonal Code 3) | SF3(Orthogonal Code 3) |

Referring to Table 3, users 1 to 3 belong to group A, and users 4 to 6 belong to group B. For a scheduling request signal of group A, orthogonal codes are allocated to SF3 in the first slot and SF4 in the second group. For a scheduling request signal of group B, orthogonal codes are allocated to SF4 in the first slot and SF3 in the second group. User 1 of group A uses orthogonal code 1 of the length of SF3 in the first slot and orthogonal code 1 of the length of SF4 in the second slot. User 4 of group B paired with user 1 of group A uses orthogonal code 1 of the length of SF4 in the first slot and orthogonal code 1 of the length of SF3 in the second slot.

In the same manner, user 2 of group A shares orthogonal codes with user 5 of group B in pairs, and user 3 of group A shares orthogonal codes with user 6 of group B in pairs. If orthogonal codes required to transmit a scheduling request signal are shared in pairs between groups, orthogonal codes can be exchanged between users paired with each other, and thus resources can be efficiently operated.

Figure 27:
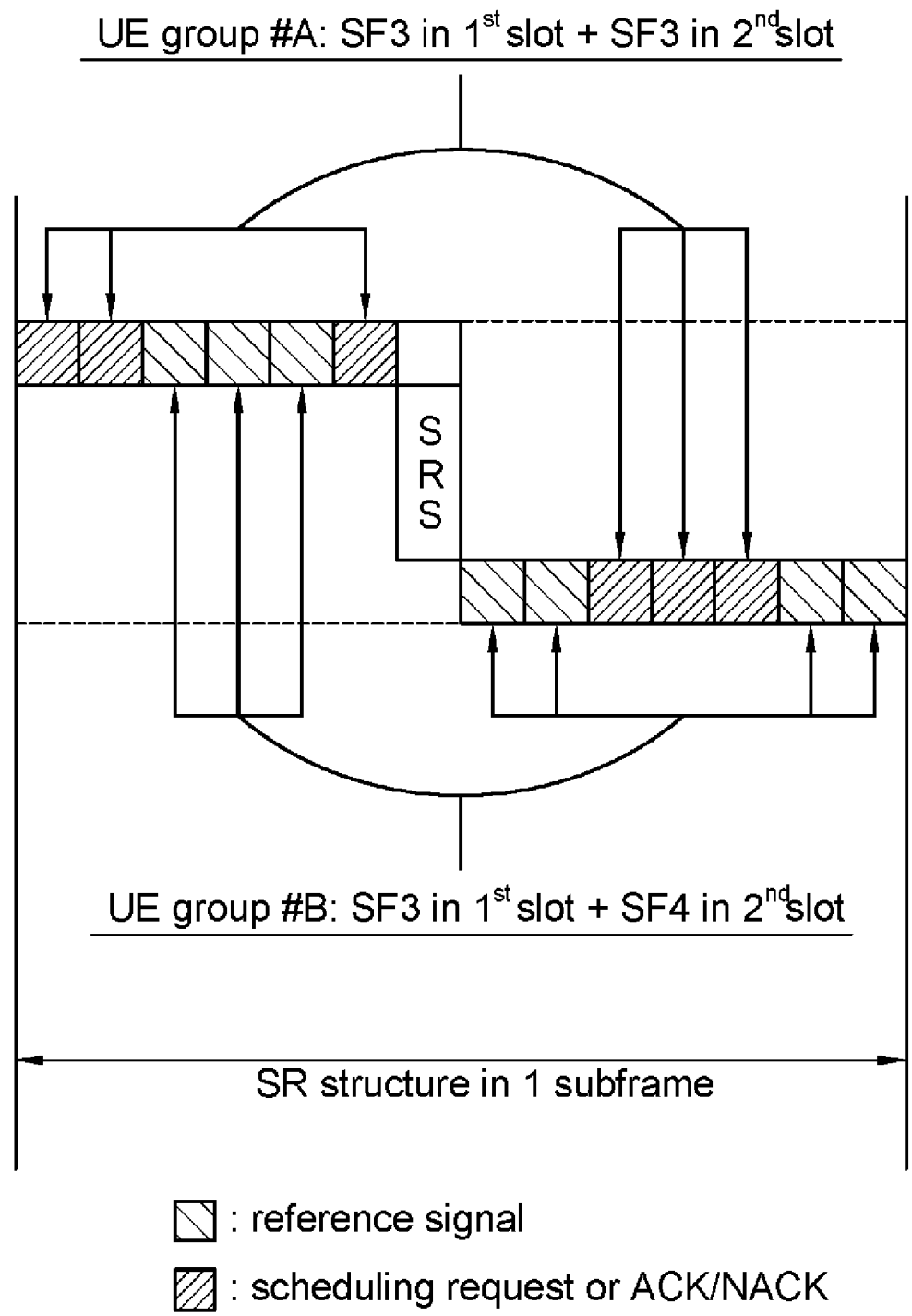
FIG. 27 shows a method of transmitting a scheduling request signal in one subframe according to still another embodiment of the present invention.

FIG. 27 shows a method of transmitting a scheduling request signal in one subframe according to still another embodiment of the present invention. It is assumed that the subframe structure shown in FIG. 27 is the same as the subframe structure shown in FIG. 3.

Referring to FIG. 27, unlike FIG. 26, FIG. 27 shows a case where a sounding reference signal is transmitted together with a scheduling request signal. Since the sounding reference signal is positioned at the last OFDM symbol of the first slot, a user of group A transmits a scheduling request signal using an orthogonal code of the length of SF4 in the first and second slots. On the other hand, a user of group B transmits a scheduling request signal using an orthogonal code of the length of SF3 in the first slot and an orthogonal code of the length of SF4 in the second slot. The position of the sounding reference signal is not required to be the last OFDM symbol of the first slot. The position of the sounding reference signal and the number of OFDM symbols shown in FIG. 27 are not limited.

Since a user of group C who should simultaneously transmit a sounding reference signal and a scheduling request signal should transmit the scheduling request signal using an orthogonal code of the length of SF3 in the first and second slots, in this case, orthogonal codes are not shared between users of different groups in pairs, but independent orthogonal codes can be used. Or, a separate orthogonal code is allocated and managed only in the first slot where a sounding reference signal is transmitted, and orthogonal codes can be operated in pairs between users of different groups in the other subframes and slots, like the relation between groups A and B. On the other hand, users who do not transmit a sounding reference signal can exchange orthogonal codes with users of the other groups in pairs.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a scheduling request signal, wherein the scheduling request signal is used to request a radio resource for uplink transmission in a wireless communication system, the method comprising:
    configuring a physical uplink control channel (PUCCH) for transmission of a scheduling request signal in a subframe, the subframe comprising two consecutive slots, a slot comprising a plurality of single carrier-frequency division multiple access (SC-FDMA) symbols, the scheduling request signal being carried by a presence or absence of transmission of the PUCCH, wherein at least one SC-FDMA symbol in the subframe is assigned for transmission of a sounding reference signal; and
    transmitting the scheduling request signal and the sounding reference signal in the subframe,
    wherein configuring the PUCCH comprises:
    dividing the plurality of SC-FDMA symbols in the slot into a first set of SC-FDMA symbols and a second set of SC-FDMA symbols;
    mapping each of first frequency domain sequences to each SC-FDMA symbol in the first set, the first frequency domain sequences being generated by cyclic shifts of a base sequence;

mapping each of second frequency domain sequences to each SC-FDMA symbol in the second set, the second frequency domain sequence being generated by cyclic shifts of the base sequence;

spreading the first frequency domain sequences in the first set with a first orthogonal covering sequence, the first orthogonal covering sequence having a length equal to the number of SC-FDMA symbols in the first set; and spreading the second frequency domain sequences in the second set with a second orthogonal covering sequence, the second orthogonal covering sequence having a length equal to the number of SC-FDMA symbols in the second set.

2. The method of claim 1, wherein the PUCCH uses at least one resource block in each of the two slots in the subframe.

3. The method of claim 2, wherein one of the two slots for the scheduling request signal uses different resource blocks in frequency domain.

4. The method of claim 2, wherein each of the two slots in the subframe is spread by orthogonal covering sequences with different lengths.

5. The method of claim 4, wherein the length of the orthogonal covering sequence for one slot including the at least one SC-FDMA symbol is shorter than that of the orthogonal sequence for the other slot.

6. The method of claim 1, wherein the at least one SC-FDMA symbol for the sounding reference signal is the last SC-FDMA symbol in the subframe.

7. The method of claim 1, wherein the first orthogonal covering sequence and the second orthogonal covering sequence are time domain sequences whose elements correspond to SC-FDMA symbols.

8. The method of claim 1, wherein the two consecutive slots in the subframe use different subcarriers in frequency domain.

9. The method of claim 1, wherein the number of SC-FDMA symbols in the first set is the same as that of SC-FDMA symbols in the second set, when the sounding reference signal is in the slot.

10. The method of claim 1, wherein the number of SC-FDMA symbols in the first set is larger than that of SC-FDMA symbols in the second set.

11. The method of claim 10, wherein the first set is assigned for a reference signal corresponding to the scheduling reference signal.

* * * * *